US010904599B2

(12) United States Patent
Sarkhel et al.

(10) Patent No.: US 10,904,599 B2
(45) Date of Patent: Jan. 26, 2021

(54) PREDICTING DIGITAL PERSONAS FOR DIGITAL-CONTENT RECOMMENDATIONS USING A MACHINE-LEARNING-BASED PERSONA CLASSIFIER

(71) Applicant: Adobe Inc., San Jose, CA (US)

(72) Inventors: Somdeb Sarkhel, Dallas, TX (US); Viswanathan Swaminathan, Saratoga, CA (US); Shuo Yang, Bloomington, IN (US); Saayan Mitra, San Jose, CA (US); Lakshmi Shivalingaiah, Berkeley, CA (US); Jason Boyer, Waltham, MA (US); Dwight Rodgers, Mountain View, CA (US)

(73) Assignee: ADOBE INC., San Jose, CA (US)

( * ) Notice: Subject to any disclaimer, the term of this patent is extended or adjusted under 35 U.S.C. 154(b) by 175 days.

(21) Appl. No.: 15/994,776

(22) Filed: May 31, 2018

(65) Prior Publication Data

US 2019/0373297 A1 Dec. 5, 2019

(51) Int. Cl.
*H04N 21/45* (2011.01)
*H04N 21/25* (2011.01)
(Continued)

(52) U.S. Cl.
CPC ........ *H04N 21/251* (2013.01); *G06K 9/6267* (2013.01); *H04N 21/25841* (2013.01);
(Continued)

(58) Field of Classification Search
CPC ......... H04N 21/4532; H04N 21/25841; H04N 21/4665; H04N 21/251; H04N 21/252;
(Continued)

(56) References Cited

U.S. PATENT DOCUMENTS 5,758,257 A * 5/1998 Herz ................... G06Q 20/383
348/E7.056
7,644,427 B1 * 1/2010 Horvitz .................. H04H 60/37
725/13

(Continued)

OTHER PUBLICATIONS

Z. Yu, X. Zhou, Y. Hao, and J. Gu, "TV program recommendation for multiple viewers based on user profile merging," in *User Modeling and User-Adapted Interaction*. Springer, 2006, pp. 63-82.
(Continued)

*Primary Examiner* — Nasser M Goodarzi
*Assistant Examiner* — Patrick A Ryan
(74) *Attorney, Agent, or Firm* — Keller Jolley Preece

(57) ABSTRACT

This disclosure relates to methods, non-transitory computer readable media, and systems that determine multiple personas corresponding to a user account for digital content and train a persona classifier to predict a given persona (from among the multiple personas) for content requests associated with the user account. By using the persona classifier, the disclosed methods, non-transitory computer readable media, and systems accurately detect a given persona for a content request upon initiation of the request. Based on determining the given persona, in some implementations, the methods, non-transitory computer readable media, and systems generate a digital-content recommendation for presentation on a client device associated with the user account.

20 Claims, 12 Drawing Sheets

(51) Int. Cl.
H04N 21/466 (2011.01)
H04N 21/258 (2011.01)
G06K 9/62 (2006.01)
G06N 20/00 (2019.01)

(52) U.S. Cl.
CPC ..... H04N 21/4532 (2013.01); H04N 21/4661 (2013.01); H04N 21/4662 (2013.01); H04N 21/4663 (2013.01); H04N 21/4665 (2013.01); H04N 21/4666 (2013.01); *G06N 20/00* (2019.01)

(58) Field of Classification Search
CPC .... H04N 21/25; H04N 21/45; H04N 21/4661; H04N 21/4662; H04N 21/4663; H04N 21/4666; G06K 9/6267
See application file for complete search history.

(56) References Cited

U.S. PATENT DOCUMENTS

| | | | | |
|---|---|---|---|---|
| 8,260,117 | B1* | 9/2012 | Xu | H04N 21/4668 386/239 |
| 8,893,185 | B2* | 11/2014 | Wasilewski | G06F 21/10 725/46 |
| 2003/0066068 | A1* | 4/2003 | Gutta | H04N 21/4661 725/9 |
| 2004/0098744 | A1* | 5/2004 | Gutta | H04N 21/6582 725/46 |
| 2007/0028266 | A1* | 2/2007 | Trajkovic | H04N 21/6582 725/46 |
| 2016/0112735 | A1* | 4/2016 | Stephens, Jr. | H04N 21/252 725/14 |

OTHER PUBLICATIONS

J. Masthoff, "Group Recommender Systems: Combining Individual Models," in *Recommender Systems Handbook*. Springer, 2011, pp. 677-702.

Z. Wang, Y. Yang, L. He, and J. Gu, "User Identification within a Shared Account: Improving IP-TV Recommender Performance," in *East European Conference on Advances in Databases and Information Systems*. Springer, 2014, pp. 219-233.

Y. Yang, Q. Hu, L. He, M. Ni, and Z. Wang, "Adaptive Temporal Model for IPTV Recommendation," in *International Conference on Web-Age Information Management*. Springer, 2015, pp. 260-271.

K. Iguchi, Y. Hijikata, and S. Nishida, "Individualizing user profile from viewing logs of several people for TV program recommendation," in *International Conference on Ubiquitous Information Management and Communication*, No. 61. ACM, 2015.

P. G. Campos, A. Bellogn, I. Cantador, and F. Dez, "Time-Aware Evaluation of Methods for Identifying Active Household Members in Recommender Systems," in *Conference of the Spanish Association for Artificial Intelligence*. Springer, 2013, pp. 22-31.

P. Bajaj and S. Sekhar, "Experience Individualization on Online TV Platforms through Persona-based Account Decomposition," in *ACM Multimedia Conference (MM)*. ACM, 2016, pp. 252-256.

A. Zhang, N. Fawaz, S. Ioannidis, and A. Montanari, "Guess Who Rated This Movie: Identifying Users Through Subspace Clustering," in *Conference on Uncertainty in Artificial Intelligence (UAI)*. ACM, 2012, pp. 944-953.

K. Verstrepen and B. Goethals, "Top-N Recommendation for Shared Accounts," in *Conference on Recommender Systems (RecSys)*. ACM, 2015, pp. 59-66.

S. Rendle, "Factorization machines with libfm," *ACM Transactions on Intelligent Systems and Technology (TIST)*, vol. 3, No. 3, p. 57, 2012.

G. Wu, V. Swaminathan, S. Mitra, and R. Kumar, "Online video session progress prediction using low-rank matrix completion," in Multimedia and Expo Workshops (ICMEW), 2014 *IEEE International Conference on*. IEEE, 2014, pp. 1-6.

G. Wu, V. Swaminathan, S. Mitra, and R. Kumar, "Context-aware video recommendation based on session progress prediction," in *Multimedia and Expo (ICME), 2017 IEEE International Conference on*. IEEE, 2017.

* cited by examiner

PREDICTING DIGITAL PERSONAS FOR DIGITAL-CONTENT RECOMMENDATIONS USING A MACHINE-LEARNING-BASED PERSONA CLASSIFIER

BACKGROUND

Network users consume digital content at an ever-increasing rate. For example, network users increasingly consume digital audio, digital video, and other content available through websites and applications. As network consumption increases, however, digital content providers expand efforts to intelligently recommend digital content that caters to users' interests. For example, some video-streaming services recommend videos that match the genre of users' previously watched videos. But such digital-content recommendations sometimes miss the mark (or target the wrong audience) with content that neither relates to nor interests the users. Digital-content recommendations can be particularly problematic when users share an account to access content from digital content providers, such as shared user accounts for audio-streaming services or video-streaming services.

To more accurately deliver recommendations, some existing digital-content-service systems configure user accounts to include options to create different profiles within the same user account. But many network users do not want to create individual profiles or disclose personal information often required (or requested) to create a profile. Even when users create such profiles, users may not consistently use a profile and, when they use or select an incorrect profile, may provide inconsistent information concerning a user's content-consumption preferences to a digital content provider. Compounding those inaccuracies, in some cases, a user may provide inaccurate personal information to create a profile. Consequently, some existing digital-content-service systems may provide digital-content recommendations to a user that are inconsistent with the underlying user's viewing or listening preferences based on a non-existent or inaccurate profile.

In addition, or in the alternative, to profiles, some existing digital-content-service systems provide users digital-content recommendations based on content-consumption behavior. For example, an audio-streaming service may determine an artist whose music a particular computing device tends to stream and, based on the identified artist, provide audio recommendations to the device. But such digital-content-service systems often cannot adjust recommendations to different users who use the same computing device with the same digital content provider. Consequently, some existing digital-content-service systems make inaccurate digital-content recommendations to a user of a shared account when recommendations are based on the content-consumption preferences of one shared user, but not other shared users.

In sum, despite using profiles or existing consumption-behavior tracking, conventional digital-content-service systems often fail to accurately detect the interests of users within a shared account or provide digital-content recommendations catered to a particular user's interests within a shared account. Such digital-content-service systems further rely on device-specific detection or other isolated context features to make digital-content recommendations that fail to distinguish between users of such shared accounts.

SUMMARY

This disclosure describes one or more embodiments of methods, non-transitory computer readable media, and systems that solve the foregoing problems in addition to providing other benefits. For example, in some embodiments, the disclosed systems determine that multiple personas correspond to a user account for digital content and train a persona classifier to predict a given persona (from among the multiple personas) for content requests associated with the user account. In certain cases, the systems identify multiple personas exhibited by a single user of the user account. By using the persona classifier, the disclosed systems accurately detect a given persona for a content request upon initiation of the request. Based on determining the given persona, in some implementations, the systems generate a digital-content recommendation for presentation on a client device associated with the user account.

For instance, in some embodiments, the disclosed systems analyze content-consumption events from a content-consumption log for a user account and generate a feature vector for each content-consumption event. Based on the feature vector for each content-consumption event, the systems generate projection values for the content-consumption events. The disclosed systems further train a persona classifier to predict personas for content requests. As part of the training, the disclosed systems create persona bins that correspond to the projection values. As further part of the training, the disclosed systems generate a persona-prediction tree that maps training contextual features to the persona bins, where the training contextual features correspond to the content-consumption events. In addition to training the persona classifier, in certain embodiments, the disclosed systems use the persona classifier to determine a persona for a content request (from among the multiple personas corresponding to the user account) and use a factorization machine to generate a digital-content recommendation for presentation on a client device associated with the user account.

BRIEF DESCRIPTION OF THE DRAWINGS

The detailed description refers to the drawings briefly described below.

DETAILED DESCRIPTION

Figure 1:
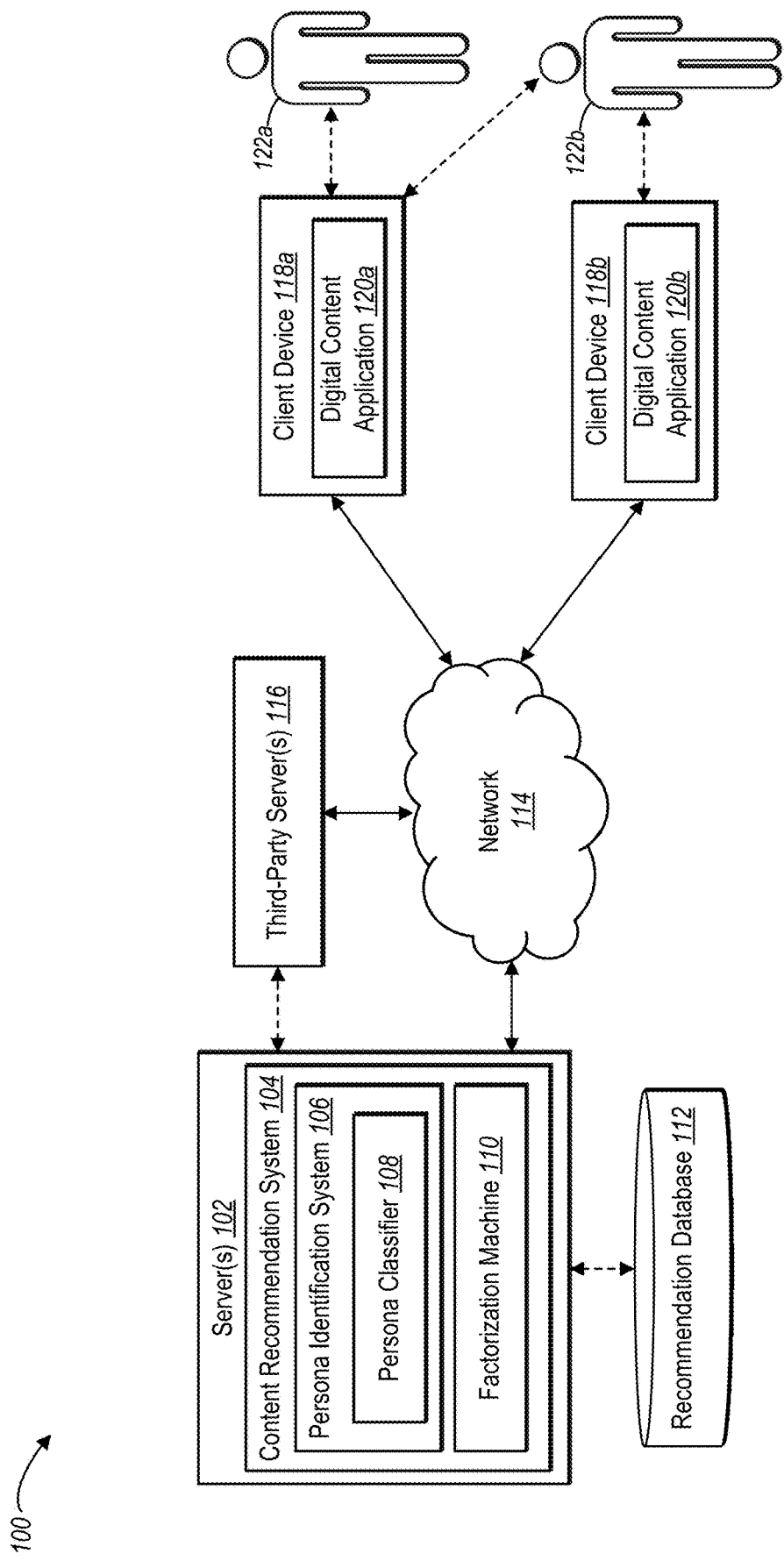
FIG. 1 illustrates a block diagram of an environment in which a persona identification system can operate in accordance with one or more embodiments.

This disclosure describes one or more embodiments of a persona identification system determining that multiple personas correspond to a user account for digital content (based on content-consumption events) and training a persona classifier to predict a given persona (from among the multiple personas) for content requests. In certain cases, the persona identification system identifies multiple personas exhibited by a single user of the user account. By using the persona classifier, the persona identification system accurately detects a given persona for a content request upon initiation of the request, such as upon a client device initializing an application or visiting a website. Based on determining the given persona, in some implementations, the persona identification system generates a digital-content recommendation for presentation on the client device associated with the user account.

For instance, in some embodiments, the persona identification system analyzes content-consumption events from a content-consumption log for a user account and generates a feature vector for each content-consumption event. Based on the feature vector for each content-consumption event, the persona identification system generates projection values for the content-consumption events. The persona identification system further trains a persona classifier to predict personas for content requests. As part of the training, the persona identification system creates persona bins corresponding to the projection values. As further part of the training, the persona identification system generates a persona-prediction tree that maps training contextual features to the persona bins, where the training contextual features correspond to the content-consumption events.

In addition to training the persona classifier, in certain embodiments, the persona identification system uses the persona classifier to determine a persona for a content request. For example, in some implementations, the persona identification system determines contextual features for a content request corresponding to a user account. Based on the contextual features, the persona identification system uses a persona classifier to determine a persona for the content request from among multiple personas corresponding to the user account. Based on the persona, the persona identification system uses a factorization machine to generate a digital-content recommendation and provides the digital-content recommendation to a client device associated with the user account.

When predicting or determining a persona corresponding to a user account, in some embodiments, the persona identification system determines a content-consumption preference within the user account. Such preferences may include, for instance, a user's tendencies of viewing video content or listening to audio content online. For example, the persona identification system may determine a persona within a user account corresponds to a preference for a particular genre of digital content together with a particular computing device streaming content from one or more locations during one or more times (e.g., times of day, week, or month).

When training a persona classifier to predict personas for content requests, the persona identification system optionally generates feature vectors representing content-consumption events from an account's content-consumption log. In certain implementations, such feature vectors may include contextual-feature values representing a computing device, a genre of digital content, a location, and a time corresponding to individual content-consumption events (e.g., a video streaming). The persona identification system may further generate a projection that corresponds to the feature vectors collectively, where each feature vector represents a different content-consumption event. For instance, in some cases, the persona identification system generates a principal-component-analysis projection corresponding to the feature vectors collectively.

Having generated a projection, in some embodiments, the persona identification system further determines projection values for content-consumption events and creates persona bins corresponding to personas of a user account. For instance, in some embodiments, the persona identification system identifies projection values (along the projection) corresponding to each feature vector and creates initial bins corresponding to each projection value. In some such embodiments, the persona identification system compares the projection values to each other and combines initial bins having projection values within a threshold variance. After combining certain initial bins, the persona identification system optionally determines a combined projection value for a combined bin (e.g., based on an average of the projection values corresponding to the newly combined initial bins).

The persona identification system optionally continues to combine bins until identifying a set of persona bins. In some implementations, for instance, the persona identification system continues to compare projection values (or combined projection values) to each other and combine bins until the remaining bins each correspond to projection values having projection-value differences outside the threshold variance.

Regardless of whether or how many bins the system combines, the persona identification system identifies each of the remaining bins as representing personas corresponding to a user account. After completing the bin-combination process, in certain embodiments, the persona bins correspond to personas that indirectly represent content-consumption preferences indicated by multiple content-consumption events. The personas may accordingly reflect, for example, the various computing devices, genres of digital content, locations, or times that correspond to such content-consumption events.

As suggested above, after creating persona bins and identifying personas, in some embodiments, the persona identification system trains a persona classifier to predict personas for content requests—from among multiple personas identified for a user account. For example, in certain implementations, the persona identification system maps various training contextual features to a persona bin and various other training contextual features to another persona bin. Such training contextual features may include, for example, a training-contextual-feature combination comprising one of several computing devices associated with a user account, one of several locations associated with the user account, and one of several times associated with the user account. In certain implementations, the persona identification system uses agglomerative clustering to combine the initial bins and create the persona bins.

In addition to creating persona bins, in some cases, the persona identification system generates a persona-prediction tree. For example, in some embodiments, the persona identification system generates a persona-prediction tree comprising determination nodes. In certain implementations, the determination nodes represent decision and intersection points for different branches of the persona-prediction tree. Based on the contextual features, the determination nodes indicate a branch or outcome for the persona-prediction tree to follow toward a persona. By generating such a persona-prediction tree for a user account, the persona identification system trains the persona classifier to accurately predict personas for content requests based on contextual features.

Having trained the persona classifier, in some implementations, the persona identification system uses the persona classifier to determine a persona for a content request. Based on the determined persona, the persona identification system uses a factorization machine to generate a digital-content recommendation. The persona identification system further provides the digital-content recommendation to a client device associated with the user account. For example, in certain embodiments, the persona identification system provides the digital-content recommendation as (i) a selectable option to transmit digital content to a client device or as (ii) digital content for a client device to present within a graphical user interface and without user selection of the digital content.

The disclosed persona identification system overcomes several technical deficiencies that hinder existing digital-content-service systems. For example, the persona identification system improves the precision with which a digital-content-service system can identify content-consumption preferences. Indeed, in certain embodiments, the persona identification system can identify and distinguish between multiple personas with different content-consumption preferences exhibited by a single user. Some existing digital-content-service systems rely on self-identifying profiles—or exclusively on device identification or a previously selected genre—to determine an identity of a user and her preferences or to identify a recommended digital-content item. By contrast, the disclosed persona identification system uses a persona classifier trained with machine learning to predict a persona for a content-consumption event. Based on an algorithm for creating a persona-prediction tree that uses both unconventional rules and a specific ordering of those rules, the persona identification system can cluster the projection values of content-consumption events to create persona bins and identify corresponding personas—including personas that existing digital-content-service systems cannot detect.

By creating persona bins that correspond to contextual features, the persona identification system can also identify content-consumption preferences with an accuracy that previously could only be performed by human analysts or unsophisticated digital-content-service systems with tedious, painstaking, and un-scalable analysis. For example, while a human analyst might theoretically be able to identify distinct content-consumption preferences for a user corresponding to contextual features, such human analysis would require access to digital content-consumption logs and painstaking account-by-account analysis that no known digital-content provider undertakes. The mere volume and digitized contextual features of content-consumption events would overwhelm and has proven impossible for human analysts. Critically, human analysts are incapable of detecting the latent features recognized by a persona classifier through machine learning, such as agglomerative clustering. The disclosed persona identification system obviates the tedious and humanly impossible process by using a unique algorithm that automates the analysis of digital content-consumption events. As set forth below, in certain embodiments, this unique algorithm includes generating projection values corresponding to contextual features and creating persona bins representing personas based on those projection values.

In addition to enhanced precision and unprecedented automation, the persona identification system improves the accuracy and flexibility with which a digital-content-service system recommends digital content. As suggested above, by relying on self-identifying profiles or contextual features alone, some existing digital-content-service systems commonly misidentify a user who initializes a content request. For instance, a user may misidentify (or ignore) profile settings or use a computing device tied to a particular content-consumption preference and thus lead a conventional digital-content-service system to recommend inapplicable digital content. By contrast, in some embodiments, the persona identification system analyzes multiple contextual features for a content request to determine an underlying persona—upon initiation of the content request. In some cases, for example, the persona identification system determines personas based on combinations of one or more computing devices, genres of digital content, locations, and times that existing digital-content-service systems cannot correlate with personas.

As used in this disclosure, the term "persona" refers to a content-consumption preference present in a user account. For example, a "persona" may include a preference for audio content or video content associated with a particular artist, company or label, genre of digital content, language, rating, or other characteristic of digital content. A given user of an account may have multiple personas. Conversely, different users of an account may have the same persona. For example, a first user of an account may have a persona with a preference for video content associated with a first genre of video (e.g., horror films) when using a particular computing device from a first location. By contrast, the first user may have a different persona with a preference for video content associated with a second and different genre of video (e.g., romantic comedies) when using the same computing device from a second and different location. A second user of the same account may likewise exhibit a preference for video content associated with the first genre of video when using the same computing device from the first location. Of course, a different user of the same account may have a completely different persona with different content-consumption preferences.

Relatedly, the term "persona classifier" refers to a machine-learning model trained to predict or determine personas for content requests. For instance, a "persona classifier" may include a regression model trained to predict a persona (from among multiple personas associated with a user account) for an audio-consumption event or a video-consumption event. Moreover, in certain embodiments, the persona identification system uses agglomerative-clustering methods to train a non-linear regression model to create persona bins and predict personas for content requests. As described further below, such clustering enables the persona identification system to create bins that correspond to personas.

The term "content-consumption event" refers to an engagement with, rating of, or transmission of digital content, such as digital-audio content or digital-video content. For example, in certain embodiments, a "content-consumption event" includes (i) a user rating of digital content associated with a user account, such as a rating of audio or video content, or (ii) a content-consumption session of viewing or listening to digital content, such as a session of viewing or listening to an instance of digital content that progresses to a threshold within the instance of digital content (e.g., a completion percentage threshold or a time threshold). The user rating may include any rating scale, including, but not limited to, a multi-dimensional scale with numbers or letters, a binary rating system indicating a like or dislike for digital content, or a written review of digital content. Moreover, the threshold time may be generic or user-account specific, such as thirty seconds, ten minutes, or an hour of progression into digital content.

Additionally, in certain implementations, a content-consumption event includes a user engaging with digital content through an interaction or sharing of the digital content. For example, in some embodiments, a content-consumption event includes a user increasing the audio volume of a digital-content item, selecting to view a digital-content item in a full-screen view, or streaming a digital-content item from one computing device to another computing device (e.g., from a mobile device to a television). As another example, in certain implementations, a content-consumption event may include sharing a digital-content item with another user (e.g., through an electronic messaging application or social networking post) or adding a comment to a digital-content item on a social networking feed. In some such embodiments, a user rating of digital content associated with a user account is based on such user engagement with a digital-content item.

Relatedly, the term "content request" refers to a digital request or call to initiate a session for consuming digital content. In certain embodiments, the term "content request" refers to a request to initiate transmission of digital content, such as a request to initiate an audio or video stream. For instance, a content request may include initializing an application (e.g., launching or opening a mobile application of a digital-content provider) or visiting a website (e.g., visiting a website of a digital-content provider that streams audio content or video content).

As noted above, in some embodiments, the persona identification system generates a projection corresponding to feature vectors. The term "projection" refers to a mapping of variables to or within at least one dimension. In some embodiments, a "projection" may refer to a mapping of a set of feature vectors into a single dimension. A projection may include, but is not limited to, an Autoencoder projection, an Isomap projection, a Locality Preserving Projection, or a principal-component-analysis projection. Relatedly, the term "projection value" refers to a value along or within a projection. Accordingly, a "projection value" may include a value along a first-principal-component-analysis projection or any other numbered principal-component-analysis projection. Conversely, a "projection value" may include a value along or within a locality-preserving projection or some other type of projection.

The term "feature vector" refers to a multi-dimensional vector representing features of a content-consumption event. For example, a "feature vector" for a content-consumption event may represent different contextual-feature values of a content-consumption event. Such contextual-feature values may include, but are not limited to, values representing a computing device, a genre or title of digital content, a location, and/or a time (e.g., a time of day, day of week, and/or time of year) for the content-consumption event.

In some embodiments, a projection value corresponds to a content-consumption event or its representative feature vector. For example, a projection value along a one-dimensional projection may correspond to a point that corresponds to a feature vector. The particular feature vector may in turn include contextual-feature values with a value for each contextual feature for a content-consumption event. Such contextual features may include, but are not limited to, a computing device, a genre or title of digital content, a location, and/or a time for the content-consumption event.

As also noted above, in some embodiments, the persona identification system creates bins. The term "bin" refers to a collection or set of one or more projection values. For example, a "bin" may include one or more projection values for one or more content-consumption events (e.g., based on feature vectors for one or more content-consumption events). As also noted above, in certain embodiments, the persona identification system creates and combines bins based on whether the bins' corresponding projection values are within a threshold variance. As the persona identification system combines bins, the combined bins correspond to multiple common projection values (e.g., a first combined bin corresponding to an average of multiple projection values and a second combined bin corresponding to an average of different multiple projection values).

Relatedly, the term "persona bin" refers to a bin comprising one or more projection values corresponding to a persona. In some embodiments, a "persona bin" refers to a bin that combines or represents the projection values of multiple bins (e.g., initial bins) that have been combined into the persona bin. Accordingly, in some cases, persona bins correspond to a persona that indirectly represents content-consumption preferences indicated by multiple content-consumption events.

In addition to creating persona bins, in some embodiments, the persona identification system generates a persona-prediction tree. The term "persona-prediction tree" refers to a model that maps training contextual features to personas. In certain embodiments, for example, the term "persona-prediction tree" refers to a decision tree that uses a determination-and-outcome model to map one or more contextual features to persona bins. In some cases, the persona identification system simultaneously generates a persona-prediction tree while creating persona bins. As the persona identification system combines and consolidates bins, the system associates a feature vector corresponding to each constituent bin's projection value with the combined bin. Because each feature vector represents a combination of contextual features, the persona classifier learns to map each training-contextual-feature combination (or, in some cases, an individual training contextual feature) to a persona bin during the persona-bin-creation process.

Relatedly, the term "contextual feature" refers to a characteristic associated with a content-consumption event or content request. Similarly, the term "training contextual feature" refers to a contextual feature associated with a content-consumption event that a persona identification system uses for training (e.g., training a persona classifier to predict personas). As an example of a contextual feature, in some cases, a contextual feature may be a computing device (or computing-device type) used to request or stream digital content, a location at which a user requested or consumed digital content, or a time at which a user requested or consumed digital content. In addition (or in the alternative) to a computing device, a contextual feature may include a connected or peripheral device used while the computing device consumes or requests digital content. In some embodiments, a contextual feature may be an artist associated with digital content, creator of the digital content (e.g., author, composer, director, narrator, journalist, podcaster, news anchor), genre of digital content (e.g., action, animation, bromance, comedy, dramedy, horror, or news videos or classical, jazz, pop, rap, or rock music), day of the week, date of the month, or subject matter of the digital content (e.g., geographical country, culture, historical event, historical figure, language).

Additionally or alternatively, in certain implementations, a contextual feature may include a software application used to consume or request digital content (e.g., a streaming application, web browser type) or a software application or website used concurrently as a computing device consumes or requests the digital content (e.g., an email application used while the computing device uses another software application to request and stream digital content). In some cases, a contextual feature includes events or actions performed before a request for digital content, such as a visit to a particular website, use of a particular software application, or consumption of a genre or type of digital content. A genre of digital content consumed before requesting other digital content may include, but is not limited to, a computing device consuming any of the genres described in this disclosure (e.g., an action video or classical music). A type of digital content consumed before requesting other digital content may include, but is not limited to, a computing device consuming digital audio content or digital video content.

When computing devices transmit or receive contextual features, in some implementations, a code or identifier represent the contextual features. For instance, such codes or identifiers may include a computing-device identifier (e.g., device type, device identifier, IP address), a location identifier (e.g., GPS, Assisted GPS, Synthetic coordinates; Received Signal Strength Indication; wireless fingerprinting), a time indicator (e.g., time stamp), and a genre identifier (e.g., a code). Rather than refer to such identifiers, however, this disclosure generally refers to the underlying contextual feature (e.g., computing device, location, time, genre).

The term "digital-content recommendation" refers to a recommendation of digital content to a user. A digital-content recommendation may indicate, for instance, suggested digital-audio content or suggested digital-video content. For example, in certain embodiments, a digital-content recommendation includes a selectable option to transmit digital content to a client device. Alternatively, as another example, a digital-content recommendation includes digital content for a client device to present within a graphical user interface—without user selection of the digital content. Moreover, in some embodiments, a digital-content recommendation takes the form of a series of suggested audio recordings or videos.

Turning now to FIG. 1, this figure illustrates a block diagram illustrating an environment 100 in which a persona identification system 106 operates in accordance with one or more embodiments. As illustrated in FIG. 1, the environment 100 includes server(s) 102; third-party server(s) 116; client devices 118a and 118b; users 122a and 122b; and a network 114, such as the Internet. The server(s) 102 host a content recommendation system 104 that includes the persona identification system 106 and a factorization machine 110. As shown in FIG. 1, the persona identification system 106 comprises computer executable instructions that, when executed by a processor of the server(s) 102, perform certain actions described below with reference to FIGS. 2-13. In general, the persona identification system 106 communicates with the content recommendation system 104 to identify personas and provide digital-content recommendations. In some embodiments, the content recommendation system 104 uses the factorization machine 110 to generate digital-content recommendations. Alternatively, in some implementations, the content recommendation system 104 uses a regression model to generate digital-content-recommendations. The content recommendation system 104 in turn facilitates the creation, modification, sharing, accessing, storing, and/or deletion of digital-content recommendations.

Although FIG. 1 illustrates an arrangement of the server(s) 102, the third-party server(s) 116, the client devices 118a and 118b, and the network 114, various additional arrangements are possible. For example, the client devices 118a and 118b may directly communicate with the server(s) 102 or the third-party server(s) 116 and thereby bypass the network 114. Although not shown in FIG. 1, in certain embodiments, the client devices 118a and 118b each include and execute computer-executable instructions that comprise all or a portion of the persona identification system 106. For explanatory purposes, however, this disclosure describes the server(s) 102 as including and executing the persona identification system 106.

As depicted in FIG. 1, in some embodiments, the users 122a and 122b both use an account for digital content. While FIG. 1 depicts the user 122a associated with the client device 118a and the user 122b associated with the client device 118b, in some cases, the users 122a and 122b use different client devices. As indicated by the dotted arrows in FIG. 1, for example, the user 122b is also at times associated with the client device 118a. When using the client device 118a, the user 122b may exhibit preferences for digital content during content-consumption events that differ from the preferences he exhibits for digital content when using the client device 118b. Moreover, the user 122a may exhibit different preferences for digital content when she uses the client device 118a. Accordingly, in some embodiments, the persona identification system 106 may detect two different personas that correspond to the user 122b and a single persona that corresponds to the user 122a—with the three different personas corresponding to the same user account.

As further illustrated in FIG. 1, the client devices 118a and 118b communicate through the network 114 with the persona identification system 106 via the server(s) 102 or with the third-party server(s) 116. In some embodiments, the users 122a and 122b access one or more digital-content items or software applications provided (in whole or in part) by the persona identification system 106, including access to digital content or download of data packets encoding for a digital content application. Additionally, in some embodiments, the users 122a and 112b access one or more digital-content items or software applications provided (in whole or in part) by the third-party server(s) 116—again including access to digital content or download of data packets encoding for a digital content application. In some such embodiments, the third-party server(s) 116 provide data to the server(s) 102 that enable the persona identification system 106 to access, download, or upload content-consumption logs for a user account or content-consumption events via the server(s) 102.

As also shown in FIG. 1, in some embodiments, the persona identification system 106 accesses, manages, analyzes, and queries data corresponding to content-consumption events, content-consumption logs, and user accounts, such as when accessing a content-consumption log. For example, in some implementations, the persona identification system 106 accesses and analyzes a content-consumption log associated with a user account, where the log is stored within the third-party server(s) 116 or, alternatively, within a recommendation database or recommendation engine (hereinafter "recommendation database 112"). In some such embodiments, after accessing the content-consumption log, the persona identification system 106 detects multiple personas corresponding to the user account based on content-consumption events from the content-consumption log.

To access the functionalities of the persona identification system 106, in certain embodiments, the users 122a and 122b interact with digital content applications 120a and 120b stored on the client devices 118a and 118b, respectively. In some embodiments, the digital content applications 120a and 120b comprise web browsers, applets, or other software applications (e.g., native applications) available to the client devices 118a and 118b. Additionally, in some instances, the persona identification system 106 provides data packets including instructions that, when executed by the client devices 118a and 118b, create or otherwise integrate the digital content applications 120a and 120b within an application or webpage. While FIG. 1 illustrates a couple client devices and a couple users, in alternative embodiments, the environment 100 includes more than the client devices 118a and 118b, the users 122a and 122b, and one user account. For example, in other embodiments, the environment 100 includes hundreds, thousands, millions, or billions of users, corresponding client devices, and corresponding user accounts.

In one or more embodiments, the client devices 118a and 118b transmit data corresponding to computing-device identifiers, dates, digital-content selections, digital-content consumption progress, locations, ratings, and times of day or week through the network 114 to the third-party server(s) 116 or, alternatively, to the persona identification system 106. In some such embodiments, the third-party server(s) 116 store such data in a content-consumption log for a user account. To generate the transmitted data or initiate communications, the users 122a and 122b interact with the client devices 118a and 118b. The client devices 118a and 118b may include, but are not limited to, mobile devices (e.g., smartphones, tablets), laptops, desktops, or any other type of computing devices, such as those described below in relation to FIG. 12. Similarly, the network 114 may comprise any of the networks described below.

As noted above, the persona identification system 106 may include instructions that cause the server(s) 102 to perform actions for the persona identification system 106. For example, in some embodiments, the server(s) 102 execute such instructions by analyzing content-consumption events from a content-consumption log for a user account, generating projection values for the content-consumption events, creating persona bins corresponding to the projection values, and generating a persona-prediction tree that maps contextual features to the persona bins. Additionally, or alternatively, in some embodiments, the server(s) 102 execute such instructions by determining contextual features for a content request corresponding to a user account, using a persona classifier to determine a persona for the content request from among multiple personas, using the factorization machine 110 to generate a digital-content recommendation for presentation on a client device associated with the user account.

As also illustrated in FIG. 1, the content recommendation system 104 is communicatively coupled to the recommendation database 112. In one or more embodiments, the persona identification system 106 or the content recommendation system 104 accesses and queries data from the recommendation database 112 associated with requests from the persona identification system 106. For instance, the persona identification system 106 may access persona files representing different personas for a user account from the recommendation database 112. As shown in FIG. 1, the recommendation database 112 is separately maintained from the server(s) 102. Alternatively, in one or more embodiments, the content recommendation system 104 and the recommendation database 112 form a single combined system or subsystem within the server(s) 102.

Figure 2:
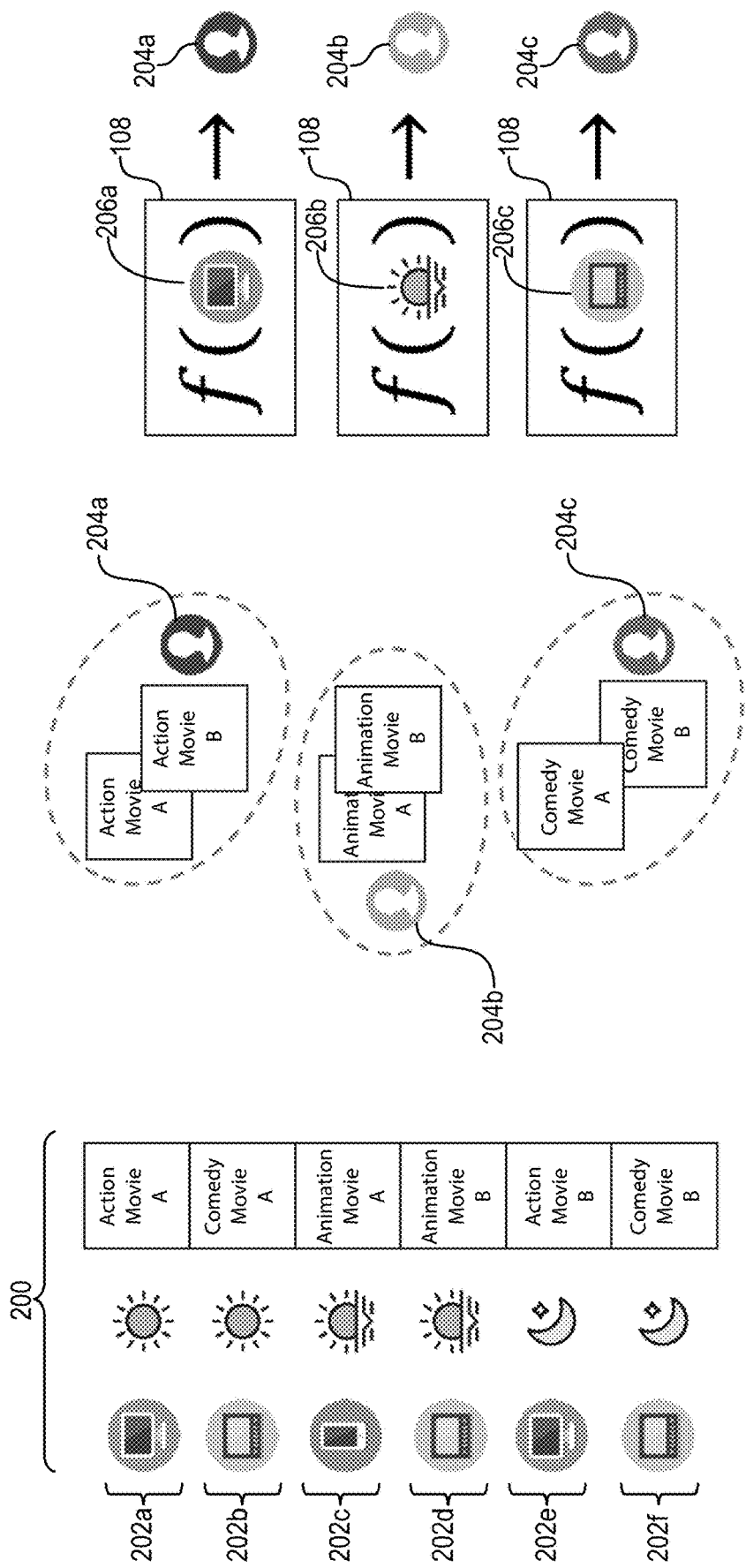
FIG. 2 illustrates a conceptual diagram of a persona identification system analyzing content-consumption events for a user account, detecting that multiple personas correspond to the user account, and predicting personas for content requests in accordance with one or more embodiments.

Turning now to FIG. 2, this figure illustrates an overview of the persona identification system 106 training the persona classifier 108 to predict personas for content requests. As an overview of FIG. 2, the persona identification system 106 analyzes content-consumption events 202a-202f from a content-consumption log 200 for a user account, detects that personas 204a-204b correspond to the user account, and trains the persona classifier 108 to predict personas for content requests. By training the persona classifier 108 to predict personas, the persona identification system 106 conditions the persona classifier 108 to intelligently determine a persona for a content request. For purposes of illustration, FIG. 2 depicts a limited number of content-consumption events. In some embodiments, however, a content-consumption log may include hundred, thousands, or millions of content-consumption events.

As shown in FIG. 2, the persona identification system 106 accesses the content-consumption log 200 for the user account. The content-consumption log 200 includes the content-consumption events 202a-202f. Here, each of the content-consumption events 202a-202f represent a logged content-consumption session of viewing digital-video content for a threshold time, such as three minutes or thirty minutes. Alternately, the content-consumption events 202a-202f may correspond to user ratings. The content-consumption events 202a-202f are merely examples. Consistent with the disclosure above, content-consumption events include different forms of engagement with digital content, such as a user increasing the audio volume of a digital-content item, selecting to view a digital-content item in a full-screen view, or sharing a digital-content item with another user through an electronic messaging application.

Each of the content-consumption events 202a-202f also include contextual features. In particular, each content-consumption event corresponds to a computing device used to access digital content from a digital-content provider's servers, a time of day for accessing the digital content, and a genre for the digital content accessed. Other contextual features could be used in addition or in the alternative, such as, but not limited to, artist associated with the digital content, creator of the digital content, time of week or month, or subject matter of the digital content.

In some embodiments, the persona identification system 106 generates feature vectors for each of the content-consumption events 202a-202f. As suggested by FIG. 2, in this particular embodiment, the persona identification system 106 generates feature vectors comprising contextual-feature values representing a computing device, a time of day, and a genre of digital content corresponding to each of the content-consumption events 202a-202f. Based on the feature vectors, the persona identification system 106 generates a projection, such as a first-principal-component-analysis projection with projection values that correspond to each of the feature vectors.

As suggested by FIG. 2, each of the personas 204a, 204b, and 204c correspond to a preference for viewing a genre of digital content. For example, the persona 204a corresponds to a preference for viewing a first genre of video (e.g., action movies), the persona 204b corresponds to a preference for viewing a second genre of video (e.g., animation movies), and the persona 204c corresponds to a preference for viewing a third genre of video (e.g., comedy movies).

While the personas 204a, 204b, and 204c indicate relatively simple preferences, in some embodiments, a persona may indicate more complex preferences. For example, in some embodiments, a persona may correspond to a preference for consuming genres of digital content in a particular order, such as a preference for a first genre over a second genre and the second genre over a third genre. Additionally, in some embodiments, a persona corresponds to a preference for digital content featuring a particular artist (e.g., actor or composer) at certain times of the week, month, or year (e.g., weekends, first of the month, end of a calendar year).

As further depicted in FIG. 2, the persona identification system 106 trains the persona classifier 108 to predict a persona for content requests from among the personas 204a-204c detected for the user account. As FIG. 2 suggests, the persona identification system 106 uses the persona classifier 108 to map training contextual features to personas. To illustrate only a few such mappings, the persona identification system 106 maps one or more contextual features 206a, one or more contextual features 206b, and one or more contextual features 206c to personas 204a, 204b, and 204c, respectively.

During training, the persona classifier 108 learns to map contextual features to the personas 204a, 204b, and 204c based on the contextual features of the content-consumption events 202a-202f. As shown, the persona classifier 108 learns to map the one or more contextual features 206a to the persona 204a based on the contextual features of the content-consumption events 202a and 202e, the one or more contextual features 206b to the persona 204b based on the contextual features of the content-consumption events 202c and 202d, and the one or more contextual features 206c to the persona 204c based on the contextual features of the content-consumption events 202b and 202f.

Figure 3:
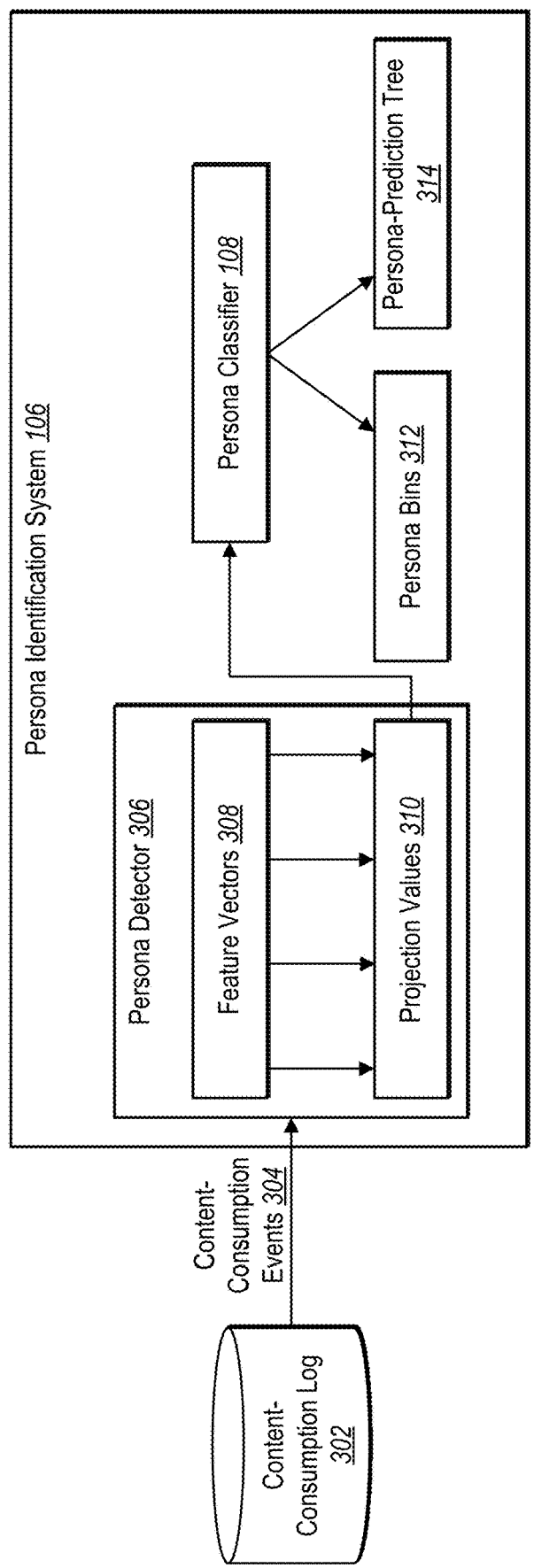
FIG. 3 illustrates a persona identification system training a persona classifier to predict personas for content requests in accordance with one or more embodiments.

As indicated above, in some embodiments, the persona identification system 106 trains the persona classifier 108. FIG. 3 illustrates the persona identification system 106 determining that multiple personas correspond to a user account for digital content and training the persona classifier 108 to predict a given persona for content requests from among the multiple personas. As an overview, after a persona detector 306 detects multiple personas for a user account, the persona identification system 106 trains the persona classifier 108 to predict personas for content requests by creating persona bins 312 associated with projection values 310 and generating a persona-prediction tree 314.

As shown in FIG. 3, a persona detector 306 of the persona identification system 106 accesses the content-consumption events 304 from a content consumption log 302. The persona detector 306 further analyzes the content-consumption events 304 to generate feature vectors 308. For example, in certain embodiments, the persona detector 306 identifies contextual features for each of the content-consumption events 304. As indicated above, the contextual features may include, but are not limited to, a computing device, a genre or title of the digital content, a location, and a time.

To generate the feature vectors 308, the persona detector 306 creates a vector for each of the content-consumption events 304 comprising contextual-feature values. In the embodiment shown in FIG. 3, the persona detector 306 creates each of the feature vectors 308 with a first contextual-feature value for a computing device, a second contextual-feature value for a genre or title of the digital content consumed, a third contextual-feature value for a location, and a fourth contextual-feature value for a time of day. As indicated above, in other embodiments, the content-consumption events 304 may include different contextual features (or a different combination of contextual features) and the feature vectors 308 may include different corresponding contextual-feature values. Additionally, in some embodiments, the feature vectors 308 further include a fifth contextual-feature value for a user identifier that indicates an identity of a particular user.

After generating the feature vectors 308, in some embodiments, the persona detector 306 generates a projection based on the feature vectors 308. For instance, the persona detector 306 optionally generates a lower-dimensional projection for each of the feature vectors 308. Accordingly, in some cases, the persona detector 306 maps the feature vectors 308 to the projection values 310, such as by mapping each of the feature vectors 308 to a single-dimensional projection value along a projection. In some such embodiments, for instance, the persona detector 306 performs principal component analysis ("PCA") to map the feature vectors 308 to PCA values along a principal-component-analysis projection. Accordingly, in some cases, the projection values 310 each represent a PCA value.

Alternatively, in certain implementations, the persona detector 306 generates an Autoencoder projection, an Isomap projection, a Locality Preserving Projection based on the feature vectors 308. In particular, the persona detector 306 may use an Autoencoder technique, an Isomap technique, or a Locality-Preserving-Projection technique to map the feature vectors 308 to projections values along an Autoencoder projection, an Isomap projection, or a Locality Preserving Projection, respectively. Accordingly, in some cases, the projection values 310 each represent an Autoencoder-projection value, an Isomap-projection value, or a Locality-Preserving-Projection value, respectively.

In addition to determining the projection values 310, in some embodiments, the persona detector 306 determines that a user account corresponds to multiple personas based on the projection values 310. For instance, in some cases, the persona detector 306 identifies multiple groups or clusters among or within the projection values 310. To identify such groups or clusters, in some cases, the persona detector 306 may use any existing clustering method. For example, in certain embodiments, the persona detector 306 uses K-means clustering with a PCA projection to identify clusters of PCA values. Additionally, in some implementations, the persona detector 306 identifies groups or clusters within the projection values 310 using account-based clustering approaches described in Zhijin Wang et al., "User Identification within a Shared Account: Improving IP-TV Recommender Performance," East European Conference on Advances in Databases and Information Systems, Advances in Database and Information Systems (Springer 2014); Yan Yang et al., "Adaptive Temporal Model for IPTV Recommendation," 16th International Conference on Web-Age Information Management, Web Age Information Management (Springer 2015); or Amy Zhang et al., "Guess Who Rated This Movie: Identifying Users Through Subspace Clustering," 28th Conference on Uncertainty in Artificial Intelligence (UAI) (2012), all of which are hereby incorporated by reference in their entirety. When the persona detector 306 identifies separate groups or clusters among or within the projection values 310, the persona detector 306 determines that the user account corresponds to multiple personas.

As further shown in FIG. 3, after the persona detector 306 determines projection values or multiple personas correspond to a user account, in some embodiments, the persona detector 306 provides the projection values 310 to the persona classifier 108 for training. Based on the projection values 310, the persona classifier 108 creates the persona bins 312 corresponding to the projection values 310 and generates the persona-prediction tree 314. The following paragraphs discuss the process of creating the persona bins 312 and the persona-prediction tree 314 in turn.

When creating the persona bins 312, in some implementations, the persona classifier 108 creates initial bins for the projection values 310. The persona classifier 108 then combines bins having projection-value differences within a threshold variance—until the remaining or resultant bins each correspond to projection values having projection-value differences outside the threshold variance. After combining the initial bins and, in some cases, combining some of the combined bins, the remaining bins are the persona bins 312 corresponding to the multiple personas for a user account.

For example, in some embodiments, the persona classifier 108 creates an initial bin for each of the projection values 310. In a set of initial bins, for instance, a first initial bin corresponds to a first projection value, a second initial bin corresponds to a second projection value, a third initial bin corresponds to a third projection value, and so on and so forth. The persona classifier 108 then compares the projection values 310 of the initial bins to each other. For instance, the persona classifier 108 compares the first projection value to each of the second projection value, the third projection value, and so on and so forth.

When comparing the projection values 310 of initial bins—or the projection values of bins in subsequent stages—the persona classifier 108 optionally ranks differences between each of the projection values. By ranking such differences, the persona classifier 108 identifies pairs of initial bins having projection-value differences comparatively smaller than other projection-value differences of other pairs of initial bins. In some such embodiments, the persona classifier 108 sorts the projection-value differences by smallest to largest. Additionally, in some cases, the persona classifier 108 identifies initial-bin pairs corresponding to a smallest total of projection-value differences, such as a set of initial-bin pairs corresponding to a smallest sum or percentage of projection-value differences from among multiple different sets (and combinations) of initial-bin pairs.

Having ranked or sorted the projection-value differences, the persona classifier 108 compares each projection-value difference corresponding to each bin pair to a threshold variance. As used in this disclosure, the term "threshold variance" refers to a projection-value difference above which corresponding bins are combined and below which corresponding bins are maintained as separate. In some embodiments, the threshold variance may be a set projection-value difference. In other embodiments, the threshold variance may be a relative projection-value difference, such as a 10%, 25%, or 50% difference. After identifying the set of initial-bin pairs described above, for instance, the persona classifier 108 compares each projection-value difference corresponding to each initial-bin pair to a threshold variance (e.g., in terms of percentage difference).

The persona classifier 108 uses the threshold variance as a marker for determining whether to combine bins. Generally, when the projection-value difference for a compared pair of bins is within the threshold variance, the persona classifier 108 combines the bins. After combining bins, in some cases, the persona classifier 108 determines a combined projection value for the combined bin, such as by determining an average of the projection values corresponding to the newly combined bins. By contrast, when the projection-value difference for a compared pair of bins is outside the threshold variance, the persona classifier 108 maintains the bins as separate bins.

Continuing the example from above, in some embodiments, the persona classifier 108 combines the first initial bin and the second initial bin into a combined bin based on determining the first projection value and the second projection value have projection values within a threshold variance. The persona classifier 108 may then determine a combined projection value for the combined bin based on an average of the first projection value and the second projection value. In contrast to the first initial bin and the second initial bin, the persona classifier 108 maintains the combined bin and the third initial bin as separate bins based on determining the combined projection value and the third projection value have projection values outside the threshold variance.

As noted above, in some embodiments, the persona classifier 108 continues to combine bins having projection-value differences within a threshold variance until the remaining bins each have projection-value differences outside the threshold variance. For example, in certain implementations, the persona classifier 108 determines that a first combined projection value (corresponding to a first combined bin) and a second combined projection value (corresponding to a second combined bin) are within the threshold variance. The persona detector 306 then combines the first combined bin and the second combined bin into a larger combined bin. At some point, the persona classifier 108 determines that the remaining bins each correspond to projection values having projection-value differences outside the threshold variance.

As shown in FIG. 3, the persona bins 312 represent the remaining bins. In certain embodiments, by consolidating bins into combined bins, the consolidated bins each correspond to a different persona. Through the collective projection values of each remaining bin, the respective persona indirectly represents content-consumption preferences indicated by the content-consumption events 304.

As further shown in FIG. 3, in addition to creating the persona bins, the persona classifier 108 generates the persona-prediction tree 314. As part of generating such a tree, for example, the persona classifier 108 maps training contextual features to one of the persona bins 312 and other training contextual features to another of the persona bins 312. To illustrate, in some embodiments, the persona classifier 108 (i) maps a first training-contextual-feature combination to a first persona bin of the persona bins 312 and (ii) maps a second contextual feature combination and a third training-contextual-feature combination to a second persona bin of the persona bins 312. One such training-contextual-feature combination may include, for example, a computing device out of multiple devices associated with a user account, a location out of multiple locations associated with the user account, and a time of several times associated with the user account. But any of the different contextual features (or combinations) in this disclosure may be used for mapping.

The term "contextual-feature combination" refers to a combination of contextual features associated with a content-consumption event or content request. Such contextual features may include, for instance, a computing device used and time at which a user requested digital content. For example, in some embodiments, the term "contextual-feature combination" refers to a combination of a computing device used for requesting or consuming digital content, a location at which the computing device requested or consumed digital content, and a time at which the computing device requested or consumed digital content. In some cases, the combination may further include a genre of digital content requested or consumed. Relatedly, the term "training-contextual-feature combination" refers to a contextual-feature combination associated with a content-consumption event that a persona identification system uses for training (e.g., training a persona classifier to predict personas).

Figure 5:
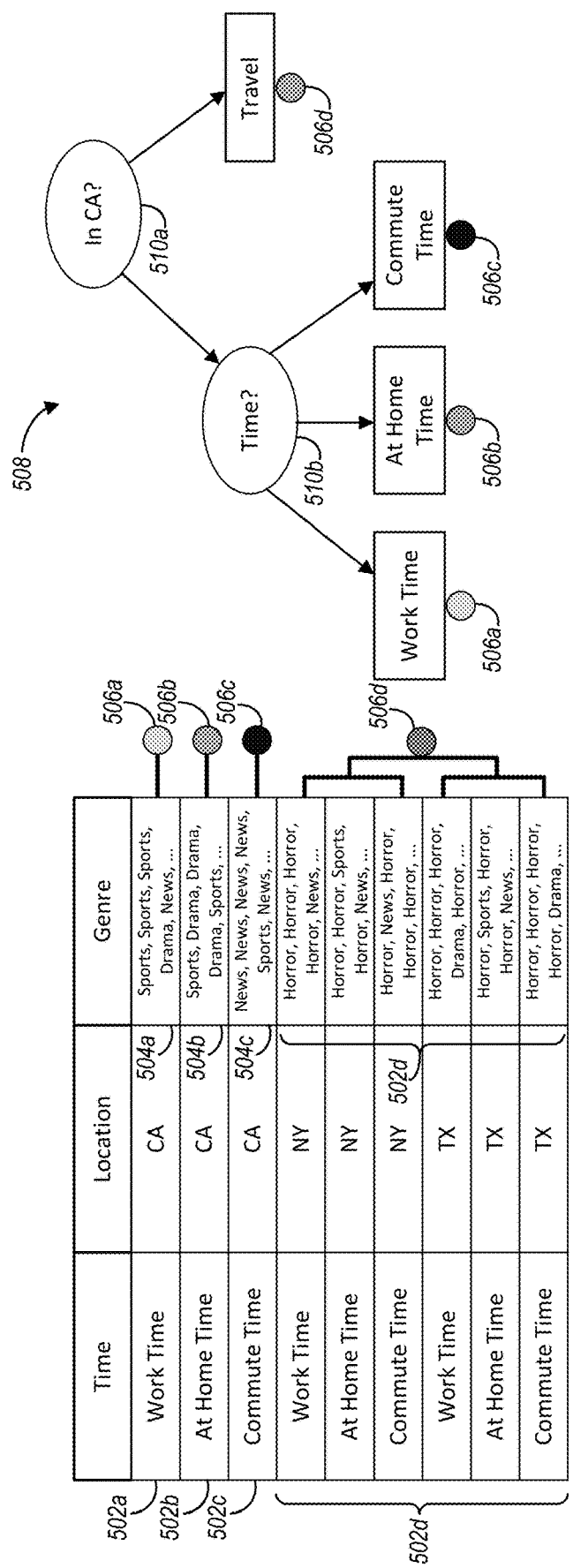
FIG. 5 illustrates a persona-prediction tree in accordance with one or more embodiments.

Mapping training contextual features to bins facilitates generating the persona-prediction tree 314. For example, in some embodiments, the persona classifier 108 generates the persona-prediction tree 314 comprising determination nodes. In certain implementations, the determination nodes represent decision and intersection points for different branches of the persona-prediction tree 314. Based on the contextual features, the determination nodes indicate a branch or outcome for the persona-prediction tree 314 to follow toward a persona bin. In some cases, the persona-prediction tree 314 includes multiple levels of determination nodes that the persona classifier 108 uses before identifying a persona bin based on contextual features. FIG. 5 depicts an example of one such persona-prediction tree. By generating the persona-prediction tree 314 for a user account, the persona identification system 106 trains the persona classifier 108 to accurately predict personas for content requests based on contextual features.

While FIG. 3 depicts one iteration of the persona identification system 106 training the persona classifier 108, in some embodiments, the persona identification system 106 retrains the persona classifier 108 for a user account as additional content-consumption events become available. For example, in some implementations, the persona identification system 106 trains the persona classifier 108 to predict personas for content requests from a user account daily, weekly, or monthly—by creating persona bins comprising projection values and generating a persona-prediction tree on a daily, weekly, or monthly basis.

Figure 4:
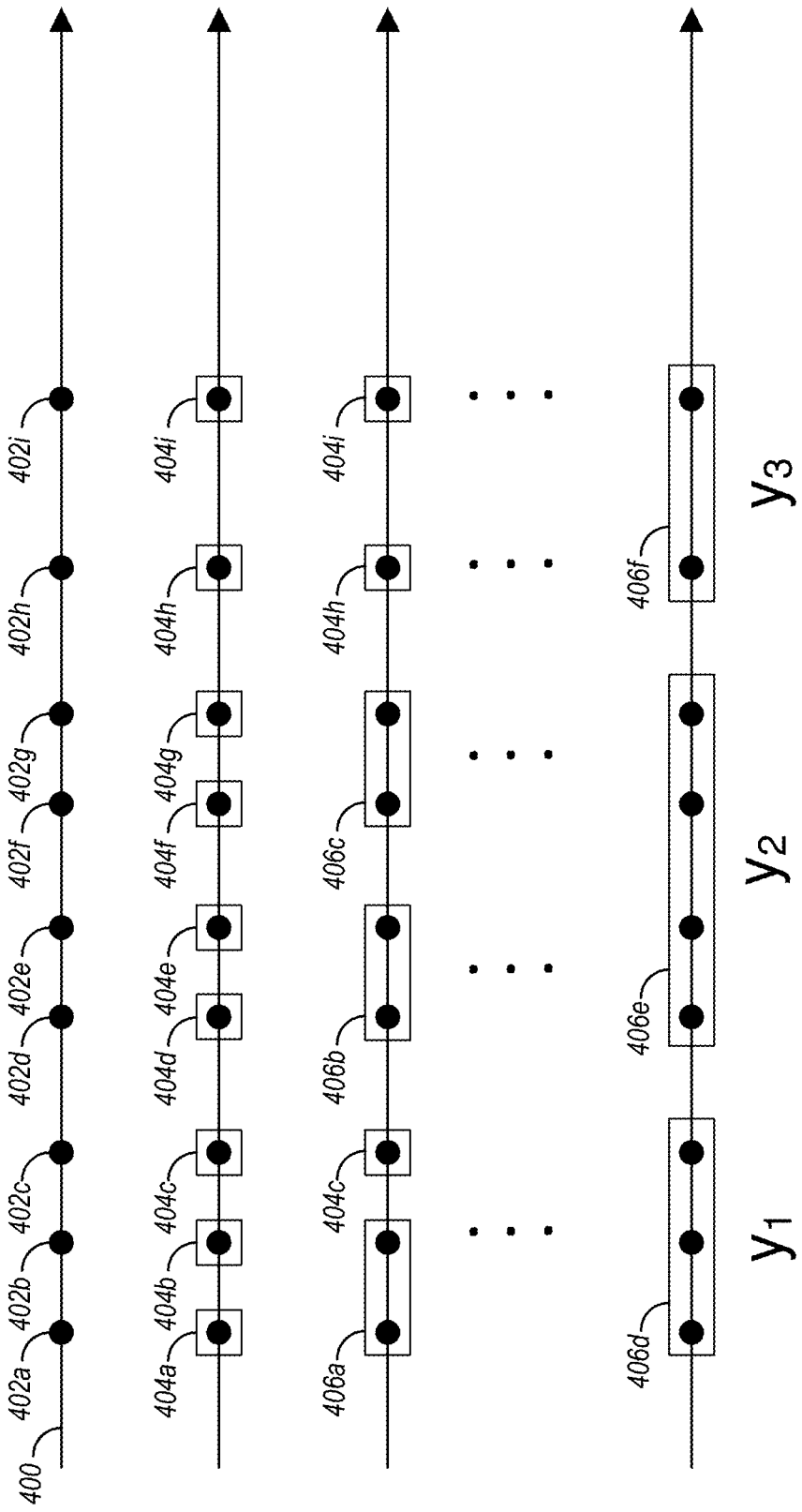
FIG. 4 illustrates a persona identification system generating projection values for content-consumption events and creating persona bins in accordance with one or more embodiments.

Turning now to FIG. 4, this figure illustrates the persona identification system 106 generating projection values for content-consumption events and creating persona bins corresponding to personas in accordance with one or more embodiments. As shown in FIG. 4, the persona identification system 106 generates a projection 400 that includes projection values 402a-402i. The persona identification system 106 further creates initial bins 404a-404i respectively corresponding to the projection values 402a-402i. In a series of combinations, the persona identification system 106 combines the initial bins 404a-404i to create persona bins 406d-406f.

Consistent with the disclosure above, the persona identification system 106 generates the projection 400 using, for example, Principal Component Analysis. In some embodiments, the persona identification system 106 generates a projection $\emptyset$ of a given set of feature vectors $x_1, \ldots x_m$, where $x_1, \ldots x_m$ are among the set of $\mathbb{R}^n$. In such embodiments, the projection $\emptyset$ represents a mapping of feature vectors $x_1, \ldots x_m$ to projection values $y_1, \ldots y_m$, where $y_1, \ldots y_m$ are among the set of $\mathbb{R}^d$. The persona identification system 106 generates the projection $\emptyset$ such that dimension d of the projection is much less than the values n in a feature vector (d<<n), and a projection value $y_i$ is representative of a feature vector $x_1$. In some such embodiments, the persona identification system 106 generates a principal-component-analysis projection for the projection $\emptyset$, where the dimension d=1.

To accurately predict personas based on bins from the projection $\emptyset$, in certain embodiments, the persona identification system 106 trains the persona classifier 108 to learn to solve the following equation:

$$f: U \times \mathcal{C}_3 \times \ldots \times \mathcal{C}_m \to \mathbb{R}^d \quad (1)$$

In equation (1), U represents a set of users corresponding to a user account. The symbol $\mathcal{C}_{tx}$ would represent the set of contextual features corresponding to content-consumption events, such as $\mathcal{C}_3$ and $\mathcal{C}_m$, where $\mathcal{C}_i \in \mathcal{C}_{tx}$. While training the persona classifier 108, in some implementations, the persona identification system 106 uses a non-parametric-agglomerative-clustering based approach to generate a non-linear regression model based on equation (1). The non-linear regression model assumes that the projection values follow a Gaussian distribution under a circumstance specified by the contextual features $\mathcal{C}_{tx}$. In other words, the projection values are Gaussian distributed conditioned on the joint state of contextual features.

To create bins that enable the persona classifier 108 to learn a mapping per equation (1), the persona identification system 106 optionally creates initial bins corresponding to the projection values along the projection $\emptyset$. FIG. 4 provides an example of such initial bins. As shown, the persona classifier 108 creates the initial bins 404a, 404b, 404c, 404d, 404e, 404f, 404g, 404h, and 404i to respectively correspond to the projection values 402a, 402b, 402c, 402d, 402e, 402f, 402g, 402h, and 402i. The initial bins 404a-404i represent an initial set of bins that the persona classifier 108 combines to create combined bins.

In some embodiments, for example, the persona identification system 106 defines a unit bin $B_i$ as $B_i = \{p_i\}$, where $p_i$ represents a first PCA value. Let $S_i^u$ represent the contextual features corresponding to an ith content-consumption event of a user u. In embodiments where d=1, for instance, the persona identification system 106 defines $p_i$ as $f(U, S_i^u) = p_i$, where U represents a set of users corresponding to a user account.

To expand a unit bin $B_i$ beyond a single element (i.e., a first PCA value), in certain implementations, the persona identification system 106 uses the following equation:

$$S_k^u = S_i^u \Rightarrow p_k \in B_i \quad (2)$$

In equation (2), $S_k^u$ represents the contextual features corresponding to a set of content-consumption events of a user u. Again, $S_i^u$ represents the contextual features corresponding to an ith content-consumption event of the user u. As indicated in equation (2), when the persona identification system 106 combines a combined bin corresponding to $S_k^u$ and a bin corresponding to $S_i^u$, the persona classifier 108 determines an average PCA value $p_k$ for the newly formed combined bin. In combining bins and averaging projection values in this manner, the persona identification system 106 assumes that each persona corresponds to specification contextual features or combination of contextual features (e.g., computing device, location, time of day).

When determining whether to combine bins, in certain implementations, the persona identification system 106 iteratively analyzes each contextual-feature value corresponding to a projection value and selects candidate bins (for combination) that have different contextual-feature values than the currently considered contextual-feature value. The persona identification system 106 may select such candidate bins for combination in part because all other contextual-feature values are in the same joint state.

As suggested above, in some embodiments, the persona identification system 106 considers a single dimension of a projection when determining to combine candidate bins, such as considering a first PCA value corresponding to a bin. The persona identification system 106 combines bins when the projection-value differences between projection values of a combined PCA value (corresponding to a combined bin) are less than the projection-value differences within a candidate bin—plus a slack variable $\mathcal{S}$. As suggested above, in some embodiments, the slack variable $\mathcal{S}$ is relative to a projection-value difference and not an absolute projection-value difference. For example, in certain embodiments, the slack variable $\mathcal{S}$ represents a hyper parameter of 10%, 25%, 50%, or some other percentage of the projection-value difference.

Additionally, in certain embodiments, the persona identification system 106 removes a contextual-feature value from a condition used to predict a projection value (e.g., first PCA value). The persona identification system 106 removes such contextual-feature values when the value is uninformative with respect to certain projection values (i.e., the first PCA value). For example, the contextual-feature value may correspond to projection values in distinct bins corresponding to average projection values outside the threshold variance.

In certain embodiments, the persona identification system 106 uses the following equation to combine bins:

$$\{\text{var}(p_i)|p_i \in B_m \cup B_n\} \leq \min[\{\text{var}(p_j)|p_j \in B_m\}, \{\text{var}(p_k) |p_k \in B_n\}] + \mathcal{S} \Rightarrow B_l = \text{combine}(B_m, B_n), S_l^u = S_m^u \cap S_n^u \quad (3)$$

In general, according to equation (3), the persona identification system 106 combines bins $B_m$ and $B_n$ into combined bin $B_l$ when the projection-value difference between the combined projection values of $B_m$ and $B_n$ is less than or equal to the smaller of the projection-value difference between the combined projection values of $B_m$ or the combined projection values of $B_n$. Additionally, equation (3) represents a non-linear agglomerative-clustering approach to combining bins. By performing this agglomerative clustering, the resulting bins correspond to contextual features that can be used to differentiate between personas. Equation (3) likewise provides a first PCA value distribution according to different training-contextual-feature combinations. The resulting bins represent a user's content-consumption preferences under different circumstances specified by contextual features.

As shown in FIG. 4, the persona classifier 108 applies equation (3) to combine several bins. In particular, the persona classifier 108 the initial bins 404a and 404b into a combined bin 406a, the initial bins 404d and 404e into a combined bin 406b, and the initial bins 404f and 404g into a combined bin 406c. Through multiple iterations of applying equation (3), the persona classifier 108 combines the combined bin 406a and the initial bin 404c into a combined bin 406d, the combined bins 406b and 406c into a combined bin 406e, and the initial bins 404h and 404i into a combined bin 406f. As indicated in FIG. 4, the resulting bins include the combined bin 406d corresponding to persona $y_1$, the combined bin 406e corresponding to persona $y_2$, and the combined bin 406f corresponding to persona $y_3$.

As noted above, in addition to creating persona bins, the persona identification system 106 generates a persona-prediction tree. FIG. 5 illustrates an example of one such persona-prediction tree. As shown in FIG. 5, the persona identification system 106 correlates training-contextual-feature combinations 502a-502d with persona bins 506a-506d when creating the persona bins 506a-506d. Based on the persona bins 506a-506d, the persona identification system 106 generates a persona-prediction tree 508 that maps training contextual features from the training-contextual-feature combinations 502a-502d to the persona bins 506a-506d.

Consistent with the disclosure above, the persona identification system 106 creates the persona bins 506a-506d by combining initial bins (or other candidate bins) and determining combined projection values for the combined initial bins (or other candidate combined bins). As indicated in FIG. 5, the persona bins 506a-506d corresponds to content-consumption preferences for genres of digital content based on genres 504a-504d. The genres 504a-504d represent genres of digital content that a user consumed during content-consumption events.

As shown in FIG. 5, for example, each of the persona bins 506a-506b correspond to primary and secondary content-consumption preferences. To illustrate, the persona bin 506a corresponds to a primary preference for a genre of digital content (e.g., sports videos) and a secondary preference for a genre of digital content (e.g., drama videos). Similarly, the persona bin 506b corresponds to a different primary preference for a genre of digital content (e.g., drama videos) and a different secondary preference for a genre of digital content (e.g., sports videos). Persona bins 506c and 506d likewise correspond to primary and secondary content-consumption preferences.

By creating the persona bins 506a-506d, the persona identification system 106 correlates the training-contextual-feature combinations 502a-502d with the persona bins 506a-506d. As indicated by FIG. 5, each of the training-contextual-feature combinations 502a-502c include (i) a contextual feature for a time during which a computing device requested or streamed digital content and (ii) a contextual feature for a location from which the computing device requested or streamed the digital content. By creating the persona bins 506a-506c, the persona identification system 106 uses projection values and the bin-combination process to correlate the training-contextual-feature combinations 502a-502c with the persona bins 506a-506c, respectively.

Conversely, the training-contextual-feature combination 502d includes multiple different combinations of (i) a contextual feature for a time and (ii) a contextual feature for a location. By creating the persona bin 506d, the persona identification system 106 uses projection values and the bin-combination process to correlate the multiple different combinations of contextual features from the training-contextual-feature combination 502d with the persona bin 506d. Although not shown in FIG. 5, the persona identification system 106 may correlate different and additional training-contextual-feature combinations with persona bins, such as training-contextual-feature combinations that each include a computing device, a location, and a time.

Based on the persona bins 506a-506d and correlated training-contextual-feature combinations 502a-502d, the persona identification system 106 also generates the persona-prediction tree 508. As shown, the persona-prediction tree 508 comprises a determination-and-outcome model by which different determinations lead to different branches of the persona-prediction tree 508 and thus to different outcomes. The persona-prediction tree 508 indicates different determination points with determination nodes 510a and 510b. By forming the persona-prediction tree 508, the persona identification system 106 learns to predict a persona for a context request based on contextual features from the training-contextual-feature combinations 502a-502d.

According to the persona-prediction tree 508, a single contextual feature from among the training-contextual-feature combinations 502a-502d may lead to a persona bin as an outcome. By contrast, multiple contextual features from among the training-contextual-feature combinations 502a-502d may lead to a different persona bin as an outcome. For example, as shown at the determination node 510a, one contextual feature (e.g., a first location) leads to the determination node 510b, but different contextual features (e.g., second or third locations) lead to the persona bin 506a as an outcome (e.g., the persona bin 506a associated with a persona for travel). As shown at the determination node 510b, however, different contextual features lead to different personas. At the determination node 510b, a first time at a first location leads to the persona bin 506a (e.g., a content-consumption event during work time in California), a second time at the first location leads to the persona bin 506b (e.g., a content-consumption event during at-home time in California), and a third time at the first location leads to the persona bin 506c (e.g., a content-consumption event during commute time in California).

For simplicity, FIG. 5 illustrates the persona-prediction tree 508 with determination nodes corresponding to a couple contextual features. In additional or alternative embodiments, the persona identification system 106 uses a persona-prediction tree with determination nodes corresponding to additional contextual features, such as determination nodes corresponding to computing devices, locations, and times. For example, in an alternative embodiment, the determination node 510b may lead to multiple determination nodes for additional contextual features. In one such embodiment, the multiple determination nodes may correspond to a particular contextual feature (e.g., multiple different times) and determine outcomes for additional contextual features (e.g., outcomes for different computing devices).

Figure 6:
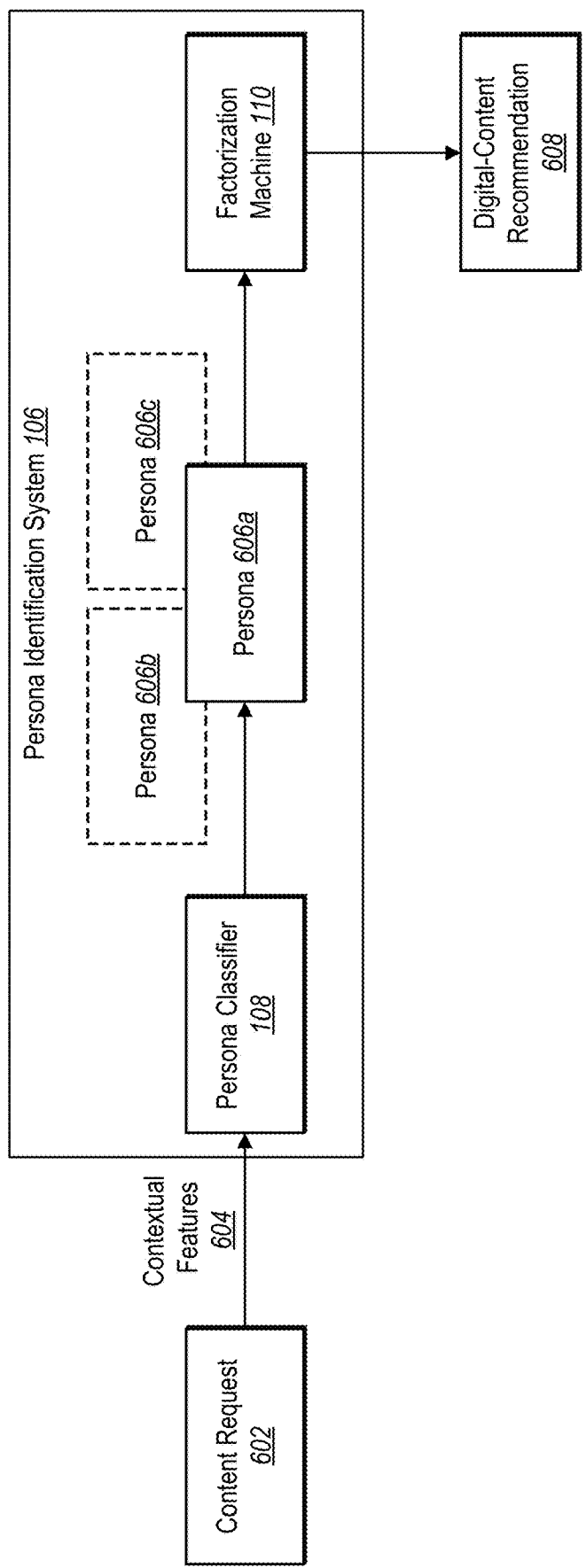
FIG. 6 illustrates a persona identification system determining a persona for a content request and generating a digital-content recommendation in accordance with one or more embodiments.

As noted above, in addition (or in the alternative) to training the persona classifier 108 to predict personas, in some embodiments, the persona identification system 106 applies the persona classifier 108 to determine personas for content requests associated with a user account. To illustrate this application, FIG. 6 depicts the persona identification system 106 determining a persona 606a for a content request 602 and generating a digital-content recommendation 608 for presentation to a client device in accordance with one or more embodiments. As indicated above, in some cases, the persona identification system 106 not only trains the persona classifier 108 for a specific user account, but also applies the persona classifier 108 to content requests sent by a client device associated with the specific user account.

As indicated in FIG. 6, and with continued reference to FIG. 1, a client device associated with a user account sends the content request 602 to the content recommendation system 104 via the server(s) 102 or to the third-party server(s) 116. For instance, in some embodiments, the client device 118a initiates the digital content application 120a and—upon initiation—sends the content request 602 for data encoding for content of a user interface to the third-party server(s) 116. As another example, in some cases, the client device 118a receives user input identifying a Uniform Resource Locator or other reference to a Uniform Resource Identifier ("URI") and sends the content request 602 to the third-party server(s) 116 requesting data encoding for a webpage associated with the URI.

After the client device sends the content request 602, the persona identification system 106 determines contextual features 604 for the content request 602 associated with the user account. In some cases, the persona identification system 106 determines the contextual features 604 before the content recommendation system 104 or the third-party server(s) 116 send digital content to the client device. Consistent with the disclosure above, the contextual features 604 may include any contextual-feature combination, including, but not limited to, a computing-device identifier, a location identifier, and a time identifier for the content request 602. In some embodiments, the persona identification system 106 receives an indication of the contextual features 604 from the third-party server(s) 116. By contrast, in some embodiments, the persona identification system 106 identifies or extracts the contextual features 604 from the content request 602, such as by extracting data indicating the contextual features 604 from the content request 602.

As further shown in FIG. 6, the persona identification system 106 uses the persona classifier 108 to determine the persona 606a for the content request 602 based on the contextual features 604. In particular, the persona classifier 108 selects the persona 606a from among personas 606a-606c as the persona associated with the content request 602. For example, in certain embodiments, the persona classifier 108 uses a persona-prediction tree to map one or more of the contextual features 604 to a persona bin from among multiple persona bins corresponding to the user account. The persona bin in turn corresponds to a persona from among multiple personas for the user account.

To illustrate the persona-prediction process, and with continued reference to FIG. 1 and FIG. 5, in certain implementations, the persona classifier 108 uses the persona-prediction tree 508 or similar persona-prediction tree. Using a determination-and-outcome model, for instance, the persona classifier 108 identifies a contextual feature from among the contextual features 604 at the determination node 510a. When the contextual features 604 include a particular contextual feature of the potential contextual features corresponding to the determination node 510a, the persona classifier 108 identifies an additional contextual feature from among the contextual features 604 at the determination node 510b. The contextual features 604 may include, for example, a first location instead of a second location. When the contextual features 604 include a particular contextual feature of the potential contextual features corresponding to the determination node 510b, the persona classifier 108 identifies a corresponding persona bin. The contextual features 604 may include, for example, a first time of multiple times and cause the persona classifier 108 to identify the persona bin 506d. As indicated by FIG. 6, the persona classifier 108 identifies a persona bin corresponding to the persona 606a.

Consistent with the disclosure above, in certain embodiments, the persona classifier 108 uses a persona-prediction tree with determination nodes corresponding to additional contextual features to map one or more of the contextual features 604 to a persona bin. Such a persona-prediction tree may include multiple levels of contextual features—including determination nodes corresponding to computing devices, locations, and times.

As further shown in FIG. 6, after determining the persona 606a for the content request 602, the persona identification system 106 provides the persona 606a to the factorization machine 110. The persona identification system 106 uses the factorization machine 110 to generate the digital-content recommendation 608 based on the persona 606a. In the embodiment shown in FIG. 6, the factorization machine 110 may comprise any of the factorization machines described in Steffen Rendle, "Factorization Machines with libFM," ACM Transactions on Intelligent Systems and Technology, Vol. 3, Article No. 57 (May 2012) (hereinafter "Rendle"), which is hereby incorporated by reference in its entirety.

When using the factorization machine 110, in some embodiments, the persona identification system 106 inputs an indicator of the persona 606a into the factorization machine 110 as part of a feature vector that the persona identification system 106 inputs into the factorization machine 110. For example, in certain embodiments, the persona identification system 106 inputs a persona feature vector representing the persona 606a into the factorization machine 110 in addition to (or as part of) a feature vector comprising contextual-feature values for a computing device, a genre of digital content, a time corresponding to individual content-consumption events, and/or a user identifier. Alternatively, in some embodiments, the persona identification system 106 inputs a persona feature vector representing the persona 606a without contextual-feature values into the factorization machine 110. Regardless of whether the persona identification system 106 inputs a persona feature vector with a feature vector comprising contextual-feature values, in certain implementations, the persona feature vector appears in the same format as one of the contextual-feature values.

For instance, in addition to inputting a "feature vector x" into a factorization machine as described in Rendle, in some cases, the persona identification system 106 inputs the persona feature vector for the persona 606a as an additional input into the factorization machine 110. As an example of such inputs, in some cases, the persona feature vector for the persona 606a may be represented by a multi-number set (e.g., [1,0,0]), the persona feature vector for the persona 606b by another multi-number set (e.g., [0,1,0]), and the persona feature vector for the persona 606c by yet another multi-number set (e.g., [0,0,1]). A corresponding "feature vector x" may likewise include multi-number sets each representing a computing device, a genre of digital content, a time corresponding to individual content-consumption events, and/or a user identifier. Based on the feature vector comprising contextual-feature values and the persona feature vector, the factorization machine 110 outputs the digital-content recommendation 608.

Although not shown in FIG. 6, in certain embodiments, the persona identification system 106 trains the factorization machine 110 to generate digital-content recommendations based on persona-specific feature vectors corresponding to a user account. For instance, in some embodiments, consistent with Rendle, the persona identification system 106 trains the factorization machine 110 to generate rating predictions for digital-content candidates, context-aware recommendations of digital content, or tag recommendations of digital content based on feature vectors for a user account. Accordingly, in some embodiments, the factorization machine 110 outputs predictions for digital-content candidates, context-aware recommendations of digital content, or tag recommendations of digital content as the digital-content recommendation 608.

In the alternative to using the factorization machine 110, in some implementations, the persona identification system 106 uses a regression model to generate the digital-content recommendation 608. Although not shown in FIG. 6, the persona identification system 106 optionally uses any regression model that employs an additional regressor to represent a bin as a variable. For example, in some cases, the persona identification system 106 uses a linear regression model or logistic regression model with a regressor that represents a bin as a variable for a particular content-consumption event.

As suggested above, the digital-content recommendation 608 may be auditory media or visual media, such as one or more suggested digital-audio content items (e.g., audio books, music recordings, podcast episodes) or one or more suggested digital-video content items (e.g., video clip, movie, television show). Alternatively, in some embodiments, the digital-content recommendation 608 may be an article (e.g., news article) or digital content describing a product or service (e.g., an image of a product or service).

In addition to generating the digital-content recommendation 608, in some embodiments, the persona identification system 106 provides the digital-content recommendation 608 to a client device associated with the user account. For example, in certain embodiments, the persona identification system 106 provides the digital-content recommendation 608 to a client device as one or more selectable options to transmit digital content to the client device. For instance, the persona identification system 106 optionally provides the digital-content recommendation 608 as a thumbnail with a selectable option that—upon selection—causes the client device to send a content request for the suggested digital content to the third-party server(s) 116.

Alternatively, in some cases, the persona identification system 106 provides the digital-content recommendation 608 to the client device as digital content for the client device to present within a graphical user interface—without user selection of the digital content. For instance, the persona identification system 106 may send the digital-content recommendation 608 in the form of an audio stream, image, or video stream with instructions causing the client device to automatically play or render the audio stream, image, or video stream.

Figure 7:
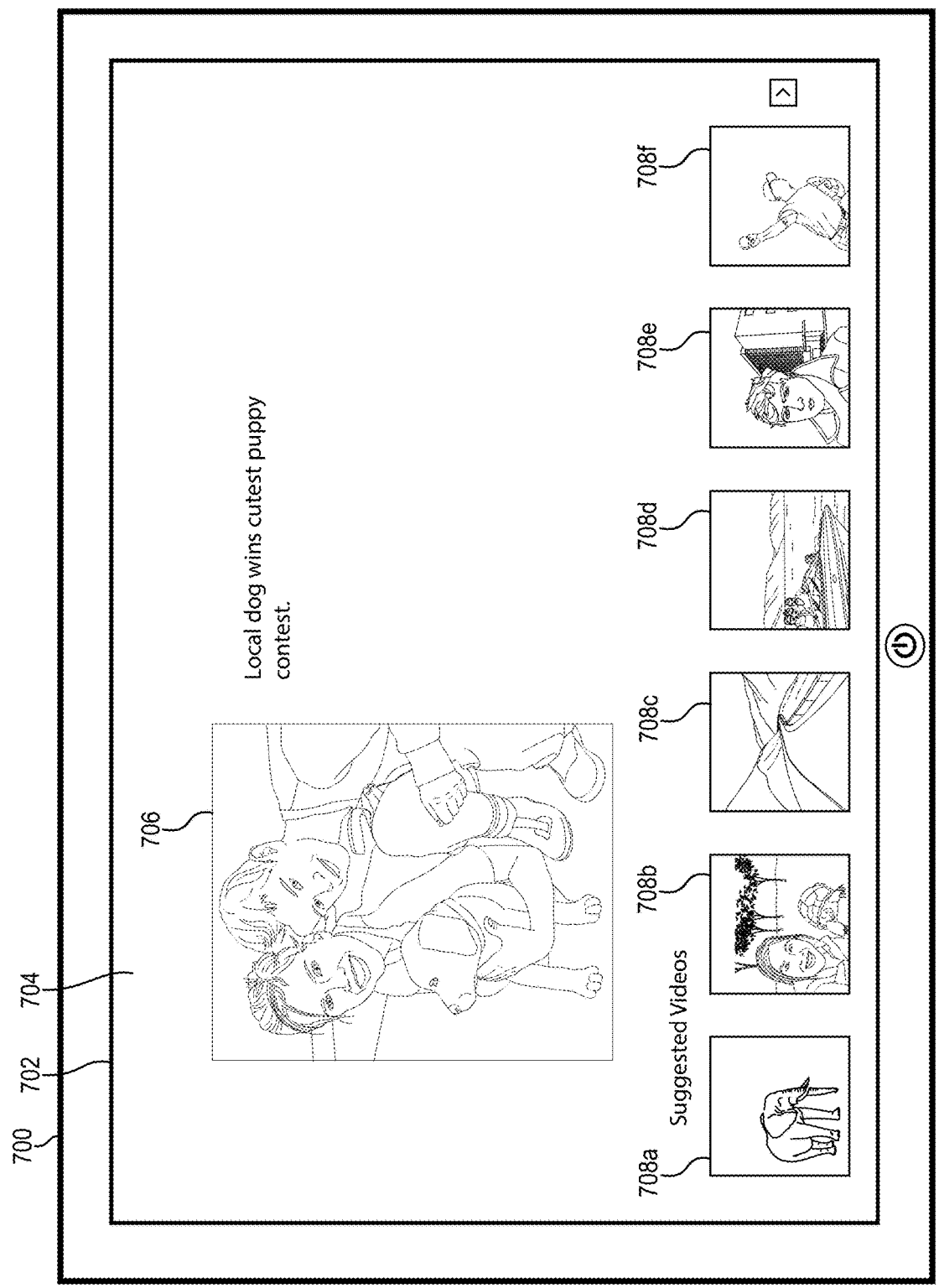
FIG. 7 illustrates a graphical user interface of a client device presenting digital-content recommendations in accordance with one or more embodiments.

As just noted, in certain embodiments, the persona identification system 106 provides a digital-content recommendation to a client device for presentation within a graphical user interface. FIG. 7 illustrates one such graphical user interface in accordance with one or more embodiments. As shown in FIG. 7, a client device 700 presents a graphical user interface 704 within a screen 702. The graphical user interface 704 includes a digital-content item 706 for which the client device 700 sent a content request. As indicated by FIG. 7, the client device 700 renders the digital-content item 706 within the graphical user interface 704, such as by rendering a video from a streaming service.

In addition to the digital-content item 706, the graphical user interface 704 includes digital-content recommendations 708a-708f. Consistent with the disclosure above, the persona identification system 106 provides the digital-content recommendations 708a-708f to the client device 700 in response to detecting a content request for the digital-content item 706. Each of the digital-content recommendations 708a-708f comprise a selectable option. Accordingly, when the client device 700 detects a selection of one of the digital-content recommendations 708a-708f, the client device 700 sends a content request for the corresponding digital content to the content recommendation system 104 via the server(s) 102 or to the third-party server(s) 116.

Additionally, or alternatively, in some embodiments, the persona identification system 106 provides one or more of the digital-content recommendations 708a-708f for automatic transmission to the client device 700. For instance, in some cases, upon receipt of the digital-content recommendation 708*a*, the client device 700 automatically initiates a content request for (and streaming of) the digital-content item corresponding to the digital-content recommendation 708*a*. In some implementations, the client device 700 initiates the content request and streaming after the conclusion of the digital-content item 706.

Moreover, the persona identification system 106 may provide the digital-content recommendations 708*a*-708*f* to stream in a particular recommended order. For instance, the persona identification system 106 may provide the digital-content recommendations 708*a*-708*f* as thumbnails with instructions that cause the client device 700—upon conclusion of the digital-content item 706—to send a content request for the digital-content item corresponding to the digital-content recommendation 708*a*. Upon the conclusion of the additional digital-content item, the digital-content recommendation 708*b* includes instructions that cause the client device 700 to send a content request for a subsequent digital-content item corresponding to the digital-content recommendation 708*b*, and so on and so forth for the digital-content recommendations 708*c*-708*f*.

Figure 8A:
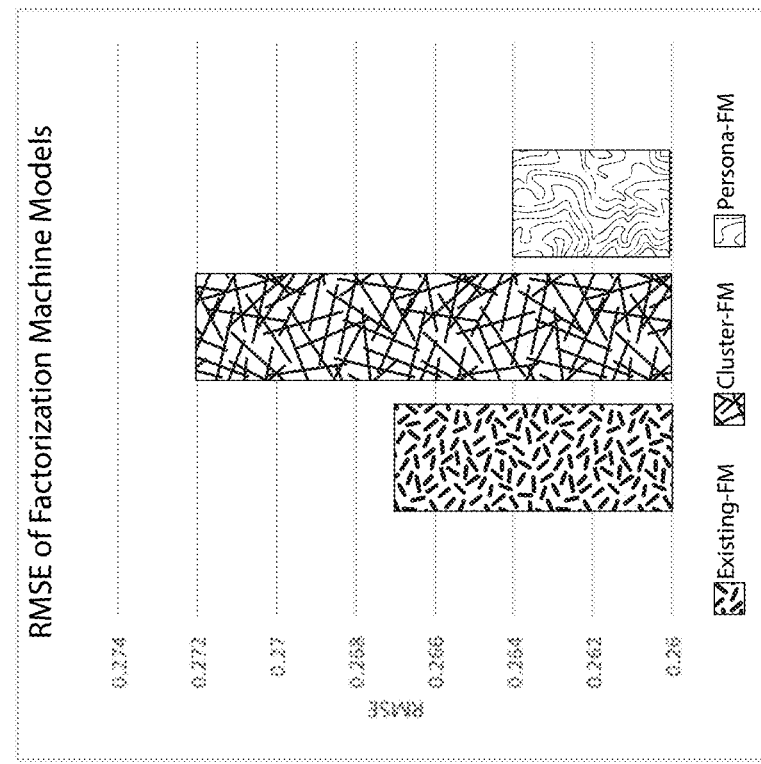
FIGS. 8A-8B illustrate graphs depicting a root-mean-square error ("RMSE") of a persona identification system and existing digital-content-recommendation systems providing digital-content recommendations based on either simulated data or real-world in accordance with one or more embodiments.
Figure 8B:
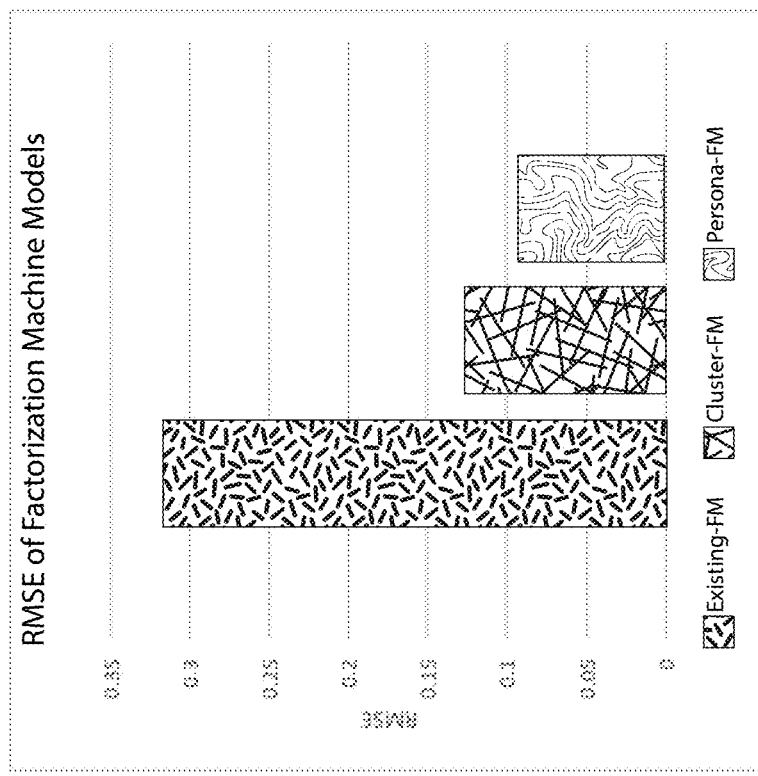

As noted above, in some embodiments, the persona identification system 106 identifies content-consumption preferences with better accuracy than existing digital-content-recommendation systems. FIGS. 8A-8B illustrate a measure of accuracy with which the persona identification system 106 and state-of-the-art digital-content-recommendation systems provide digital-content recommendations that conform to the recipient's content-consumption preferences. In particular, FIGS. 8A-8B illustrate graphs depicting a root-mean-square error ("RMSE") of the persona identification system 106 and existing digital-content-recommendation systems providing digital-content recommendations based on either simulated data or real-world data in accordance with one or more embodiments.

As shown in FIGS. 8A-8B, researchers measured the accuracy of digital-content recommendations from three different recommendation approaches. First, the researchers measured the RMSE of digital-content recommendations from an existing factorization machine described in Rendle (hereinafter, "Existing-FM"). Second, the researchers measured the RMSE of digital-content recommendations from a factorization machine trained to make recommendations using an account-based-clustering approach (hereinafter, "Cluster-FM"). The Cluster-FM approach clusters projection values for each individual user account separately and considers each cluster as a distinct user. Moreover, the Cluster-FM approach identifies clusters of projection values based on a silhouette score. Third, the researchers measured the RMSE of digital-content recommendations from the persona identification system 106 with a factorization machine (hereinafter "Persona-FM"), such as the persona identification system 106 depicted in FIG. 6. For each experiment, the researchers use a slack variable of 25%.

In FIG. 8A, the researchers determined RMSE based on a simulated dataset in which multiple users used each user account. The dataset further includes simulated rating events by users as part of content-consumption events. In the simulated dataset, video recommendations from the Existing-FM, Cluster-FM, or Persona-FM were marked as "liked" or "disliked" when the recommendations conformed to the simulated users' content-consumption preferences. The simulated dataset includes approximately 25,000 such ratings events from 600 users on 198 videos.

In particular, the rating events have a first contextual feature for a computing device with two possible values (Device A and Device B) and a second contextual feature for a video genre with two possible values (Genre A and Genre B). In the simulated dataset, each user prefers one genre (e.g., Genre A) when using one device (e.g., Device A) and the other genre (e.g., Genre B) when using the other device (e.g., Device B). The researchers used 90% of the 25,000 simulated rating events for training the Existing-FM, Cluster-FM, and Persona-FM and 10% of the 25,000 simulated rating events for testing the trained Existing-FM, Cluster-FM, and Persona-FM.

As shown in FIG. 8A, the Persona-FM demonstrated the least amount of error in digital-content recommendations from among the Existing-FM, Cluster-FM, and Persona-FM. In other words, the digital-content recommendations from the Persona-FM matched the simulated users' content-consumption preferences more frequently than the digital-content recommendations from the Existing-FM or Cluster-FM. The graph for FIG. 8A shows the RMSE for the Persona-FM as lower than the RMSE for either the Existing-FM or the Cluster-FM. FIG. 8A thus demonstrates from simulated data that the persona identification system 106 identifies content-consumption preferences with better accuracy than state-of-the-art digital-content-recommendation systems.

In FIG. 8B, the researchers determined RMSE based on a real dataset. The real dataset included content-consumption logs for a one-month period from multiple user accounts. Because the dataset used for FIG. 8B is real, the user accounts may or may not have shared users. As noted above, however, the user accounts may belong to a single user who exhibits different personas in different contexts, such as one persona with content-consumption preferences at work and another persona with different content-consumption preferences at home. The real dataset further includes 401,844 content-consumption events from 12,022 users for 2,005 videos using 9 different types of computing devices. The content-consumption events come from 550 different geographical regions as locations. Moreover, the 2,005 videos include 16 different video genres. Instead of using rating events, the content-consumption events comprise viewing sessions that progress to a threshold time. Accordingly, the researchers determined whether the user "liked" or "disliked" digital content based on the amount of progress through the video. Moreover, the researchers used 398,844 content-consumption events for training the Existing-FM, Cluster-FM, and Persona-FM and 3,000 random content-consumption events for testing the trained Existing-FM, Cluster-FM, and Persona-FM.

As shown in FIG. 8B, the Persona-FM again demonstrates the least amount of error in digital-content recommendations from among the Existing-FM, Cluster-FM, and Persona-FM. In particular, the RMSE for the Persona-FM is lower than the RMSE for either the Existing-FM or the Cluster-FM. The respective RMSEs suggest that digital-content recommendations from the Persona-FM produced viewing sessions of digital content up to a threshold time more frequently than the digital-content recommendations from the Existing-FM or Cluster-FM. FIG. 8B thus demonstrates from a real dataset that the persona identification system 106 identifies content-consumption preferences with better accuracy than state-of-the-art digital-content-recommendation systems.

Figure 9:
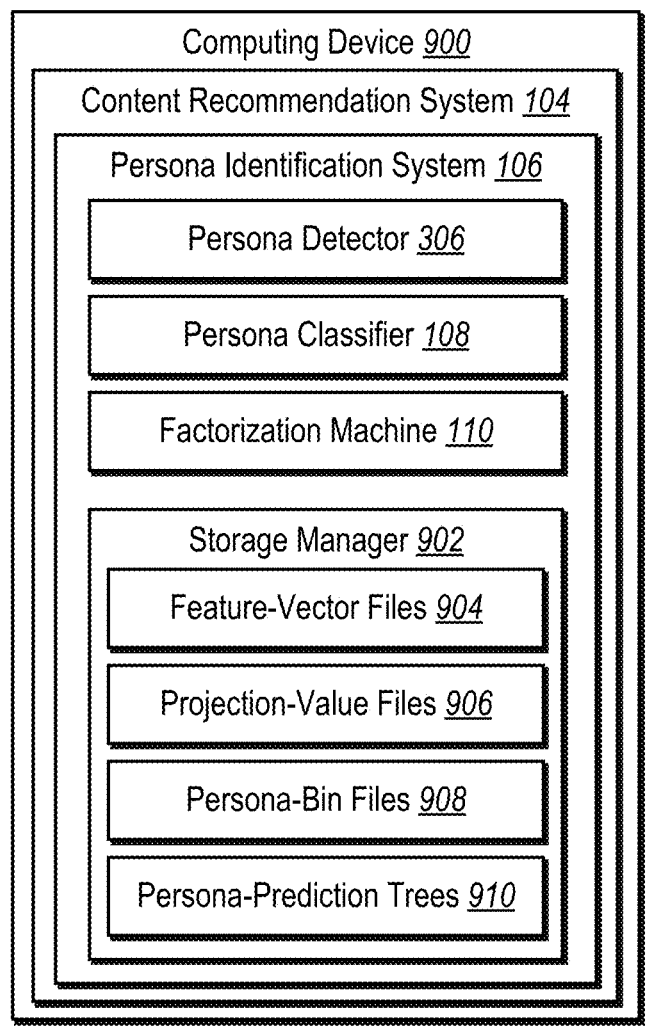
FIG. 9 illustrates a schematic diagram of the persona identification system of FIG. 1 in accordance with one or more embodiments.

Turning now to FIG. 9, this figure provides additional detail regarding components and features of the persona identification system 106. In particular, FIG. 9 illustrates a computing device 900 implementing the content recommendation system 104 and the persona identification system 106.

In some embodiments, the computing device 900 comprises one or more servers (e.g., the server(s) 102). In other embodiments, the computing device 900 comprises one or more client devices (e.g., the client device 118a).

As shown in FIG. 9, the computing device 900 includes the content recommendation system 104. In some embodiments, the content recommendation system 104 communicates with the persona identification system 106 to provide digital-content recommendations. For example, in some cases, the content recommendation system 104 facilitates the creation, modification, sharing, accessing, storing, and/or digital-content recommendations.

As further shown in FIG. 9, the computing device 900 includes the persona identification system 106. The persona identification system 106 includes, but is not limited to, the persona detector 306, the persona classifier 108, the factorization machine 110, and a storage manager 902. The following paragraphs describe each of these components in turn.

The persona detector 306 determines whether a user account corresponds to multiple personas. For example, in some embodiments, the persona detector 306 accesses content-consumption events for a user account and generates feature vectors based on contextual features of the content-consumption events. Additionally, in some implementations, the persona detector 306 generates a projection based on the feature vectors and identifies projection values corresponding to the content-consumption events. To determine whether a user account corresponds to multiple personas, in some embodiments, the persona detector 306 identifies one or more groups or clusters among or within the projection values.

As shown in FIG. 9, the persona identification system 106 trains the persona classifier 108 to predict personas for content requests. As part of that training, the persona classifier 108 creates persona bins and generates a persona-prediction tree for a user account. For example, the persona classifier 108 creates persona bins corresponding to projection values in accordance with one or more embodiments described with reference to FIGS. 3 and 4. Moreover, as another example, the persona classifier 108 generates a persona-prediction tree in accordance with one or more embodiments described with reference to FIGS. 3 and 5. In certain embodiments, the persona identification system 106 updates or retrains the persona classifier 108 on a periodic basis (e.g., every day, week, month) or upon receiving a threshold number of content-consumption events for a user account.

In addition (or in the alternative) to creating persona bins and persona-prediction trees, in some embodiments, the persona classifier 108 also determines a persona for a content request. Consistent with the disclosure above, in some cases, the persona identification system 106 uses the persona classifier 108 to determine a persona from among multiple personas associated with a user account based on contextual features of a content request. In some embodiments, the persona classifier 108 uses a persona-prediction tree to map contextual features to a persona bin corresponding to the predicted persona.

As also shown in FIG. 9, the persona identification system 106 includes the factorization machine 110. Consistent with the disclosure above, in some embodiments, the factorization machine 110 generates digital-content recommendations based on a persona identified by the persona classifier 108. FIG. 6 depicts an example of the factorization machine 110 generating a digital-content recommendation. In certain implementations, the persona identification system 106 further trains the factorization machine 110 to generate digital-content recommendations based on identified personas.

As also shown in FIG. 9, the persona identification system 106 includes the storage manager 902. In certain embodiments, the storage manager 902 includes non-transitory computer readable media. Among other things, the storage manager 902 maintains feature-vector files 904, projection-value files 906, persona-bin files 908, and/or persona-prediction trees 910. In some cases, the storage manager 902 maintains the feature-vector files 904, the projection-value files 906, the persona-bin files 908, and/or the persona-prediction trees 910 by user account.

As shown in the storage manager 902, the feature-vector files 904 optionally comprise features vectors that the persona identification system 106 generates for a user account's content-consumption events. Similarly, the projection-values files 906 optionally comprise projection values that the persona identification system 106 generates for feature vectors. Moreover, the persona-bin files 908 may comprise persona bins corresponding to a user account that the persona identification system 106 creates and uses when analyzing content requests associated with the user account. Furthermore, in some cases, the persona-prediction trees comprise a persona-prediction tree for different user accounts. As noted above, the persona identification system 106 optionally updates or regenerates a persona-prediction tree for a user account during an update or retraining process.

Each of the components 108, 110, 306, and 902-910 of the persona identification system 106 can include software, hardware, or both. For example, the components 108, 110, 306, and 902-910 can include one or more instructions stored on a computer-readable storage medium and executable by processors of one or more computing devices, such as a client device or server device. When executed by the one or more processors, the computer-executable instructions of the persona identification system 106 can cause the computing device(s) to perform the actions, processes, and methods described herein. Alternatively, the components 108, 110, 306, and 902-910 can include hardware, such as a special-purpose processing device to perform a certain function or group of functions. Alternatively, the components 108, 110, 306, and 902-910 of the persona identification system 106 can include a combination of computer-executable instructions and hardware.

Furthermore, the components 108, 110, 306, and 902-910 of the persona identification system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 108, 110, 306, and 902-910 may be implemented as a stand-alone application, such as a desktop or mobile application. Furthermore, the components 108, 110, 306, and 902-910 may be implemented as one or more web-based applications hosted on a remote server. The components 108, 110, 306, and 902-910 may also be implemented in a suite of mobile device applications or "apps." To illustrate, the components 108, 110, 306, and 902-910 may be implemented in a software application, including but not limited to ADOBE® PRIMETIME RECOMMENDATIONS®, ADOBE® PHOTOSHOP®, ADOBE TARGET®, or ADOBE® LIGHTROOM®. "ADOBE," "PRIMETIME RECOMMENDATIONS," "PHOTOSHOP," "ADOBE TARGET," and "LIGHTROOM" are either registered trademarks or trademarks of Adobe Systems Incorporated in the United States and/or other countries.

Figure 10:
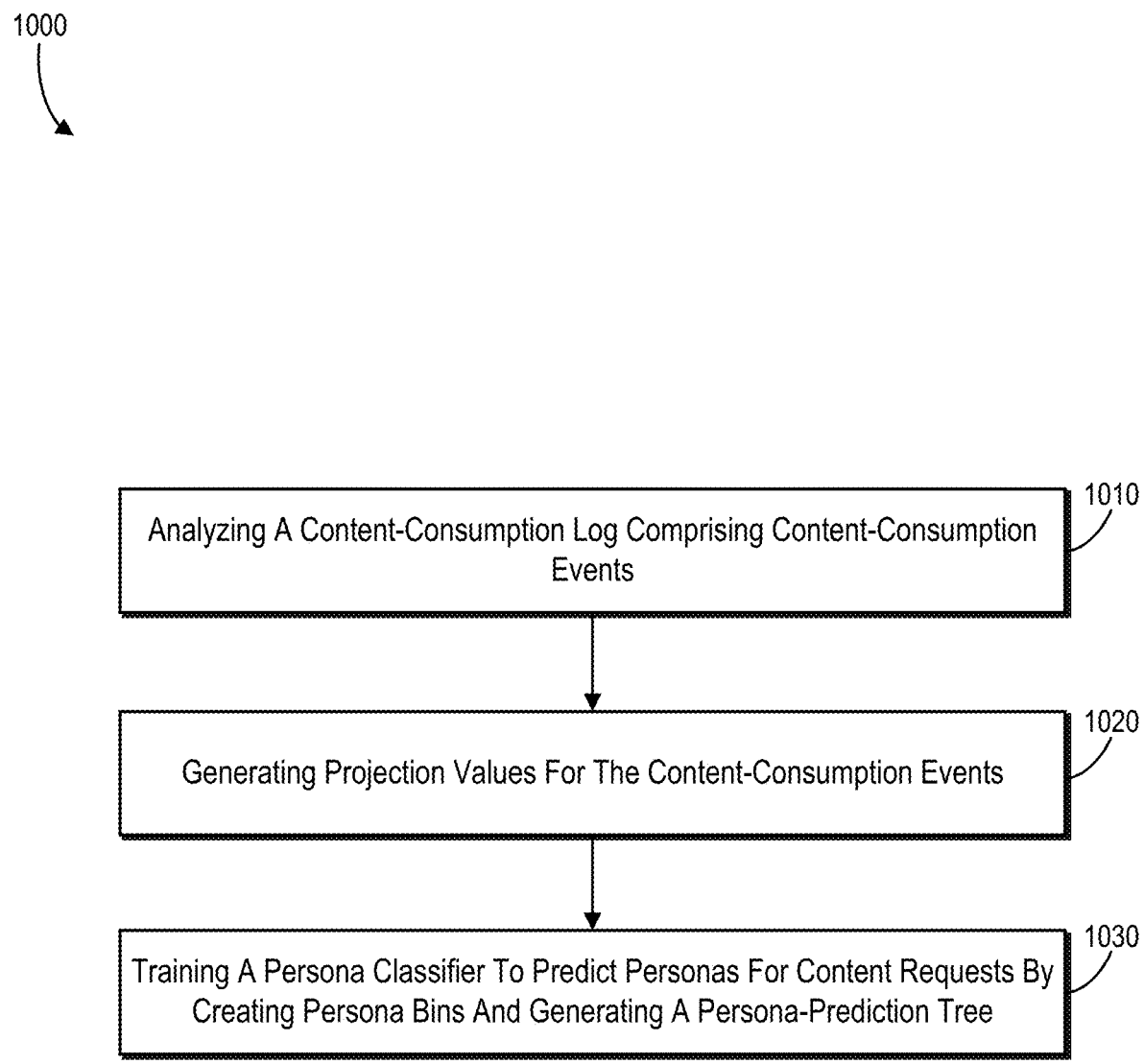
FIG. 10 illustrates a flowchart of a series of acts for training a persona classifier to predict personas for content requests in accordance with one or more embodiments.

Turning now to FIG. 10, this figure illustrates a flowchart of a series of acts 1000 of training a persona classifier to predict personas for content requests in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable storage medium can comprise instructions that, when executed by one or more processors, cause a computing device to perform the acts depicted in FIG. 10. In still further embodiments, a system can perform the acts of FIG. 10.

As shown in FIG. 10, the acts 1000 include an act 1010 of analyzing a content-consumption log comprising content-consumption events. For example, in some embodiments, the act 1010 includes analyzing a content-consumption log comprising a plurality of content-consumption events for a user account.

In one or more embodiments, each content-consumption event is represented by a feature vector and each feature vector representing a content-consumption event comprises contextual-feature values corresponding to one or more of a computing device, a genre of digital content, a location, and a time of day. Additionally, in some implementations, the plurality of content-consumption events comprises one or more of user ratings of digital content associated with the user account or content-consumption sessions of digital content that progress to a threshold time within the digital content. Additionally, or alternatively, the plurality of content-consumption events comprises one or more of increasing audio volume of a digital-content item, selecting to view the digital-content item in a full-screen view, streaming the digital-content item from one computing device to another computing device, sharing the digital-content item with another user through an electronic messaging application, or adding a comment to the digital-content item on a social networking feed.

As further shown in FIG. 10, the acts 1000 include an act 1020 of generating projection values for the content-consumption events. For example, in certain embodiments, the act 1020 includes generating a plurality of projection values for the plurality of content-consumption events.

As suggested above, in one or more embodiments, generating the plurality of projection values comprises generating a principal-component-analysis projection based on a plurality of feature vectors representing the plurality of content-consumption events; and determining the plurality of projection values for the plurality of content-consumption events based on the principal-component-analysis projection.

As further shown in FIG. 10, the acts 1000 include an act 1030 of training a persona classifier to predict personas for content requests by creating persona bins and generating a persona-prediction tree. For example, in certain implementations, the act 1030 includes training a persona classifier to predict personas for content requests by creating a plurality of persona bins corresponding to the plurality of projection values for the plurality of content-consumption events; and generating a persona-prediction tree that maps training contextual features to the plurality of persona bins, wherein the training contextual features correspond to the plurality of content-consumption events.

As suggested above, in some embodiments, creating the plurality of persona bins corresponding to the plurality of projection values comprises creating a plurality of initial bins corresponding to the plurality of projection values, wherein a first initial bin corresponds to a first projection value, a second initial bin corresponds to a second projection value, and a third initial bin corresponds to a third projection value; comparing the first projection value to each of the second projection value and the third projection value; and based on the first projection value and the second projection value having projection values within a threshold variance, combining the first initial bin and the second initial bin into a combined bin.

Relatedly, in some implementations, creating the plurality of persona bins corresponding to the plurality of projection values comprises determining a combined projection value for the combined bin based on an average of the first projection value and the second projection value; comparing the combined projection value for the combined bin to the third projection value for the third initial bin; and based on the combined projection value and the third projection value having projection values outside the threshold variance, maintaining the combined bin and the third initial bin as separate bins.

Moreover, in certain embodiments, creating the plurality of persona bins corresponding to the plurality of projection values in part comprises comparing each of the plurality of initial bins to each other based on projection value; identifying initial-bin pairs corresponding to a smallest total of projection-value differences; and comparing each projection-value difference corresponding to each initial-bin pair of the initial-bin pairs to the threshold variance.

As noted above, in certain implementations, creating the plurality of persona bins corresponding to the plurality of projection values comprises determining that a first combined projection value corresponding to a first combined bin and a second combined projection value corresponding to a second combined bin are within the threshold variance; combining the first combined bin and the second combined bin into an additional combined bin, wherein the combined bin and the additional combined bin are part of the plurality of persona bins; and determining that the plurality of persona bins each correspond to projection values having projection-value differences from each other outside the threshold variance.

Additionally, in some embodiments, generating the persona-prediction tree that maps the training contextual features to the plurality of persona bins comprises mapping a first training-contextual-feature combination of the training contextual features to a first persona bin of the plurality of persona bins; and mapping a second training-contextual-feature combination and a third training-contextual-feature combination of the training contextual features to a second persona bin of the plurality of persona bins.

Relatedly, in certain embodiments, the first training-contextual-feature combination comprises one computing device from a plurality of computing devices, one location from a plurality of locations, and one time from a plurality of times; and the second training-contextual-feature combination comprises one computing device from the plurality of computing devices, one location from the plurality of locations, and one time from the plurality of times.

In addition to the acts 1010-1030, in some embodiments, the acts 1000 further include determining contextual features for a content request corresponding to the user account; utilizing the persona classifier to determine a persona for the content request from among a plurality of personas corresponding to the user account based on the contextual features; and based on the persona, utilizing the factorization machine to generate a digital-content recommendation for presentation on a client device associated with the user account. In some such embodiments, utilizing the persona classifier to determine the persona for the content request from among the plurality of personas corresponding to the user account comprises mapping contextual features for the content request to a first persona bin of the plurality of persona bins.

In addition (or in the alternative) to the acts describe above, in some embodiments the acts 1000 include a step for training a persona classifier to predict personas for content requests associated with a user account based on a plurality of content-consumption events associated with the user account and a plurality of persona associated with the user account. The algorithms and acts described in reference to FIG. 4 comprise the corresponding acts for a step for training a persona classifier to predict personas for content requests associated with a user account based on a plurality of content-consumption events associated with the user account and a plurality of persona associated with the user account.

Figure 11:
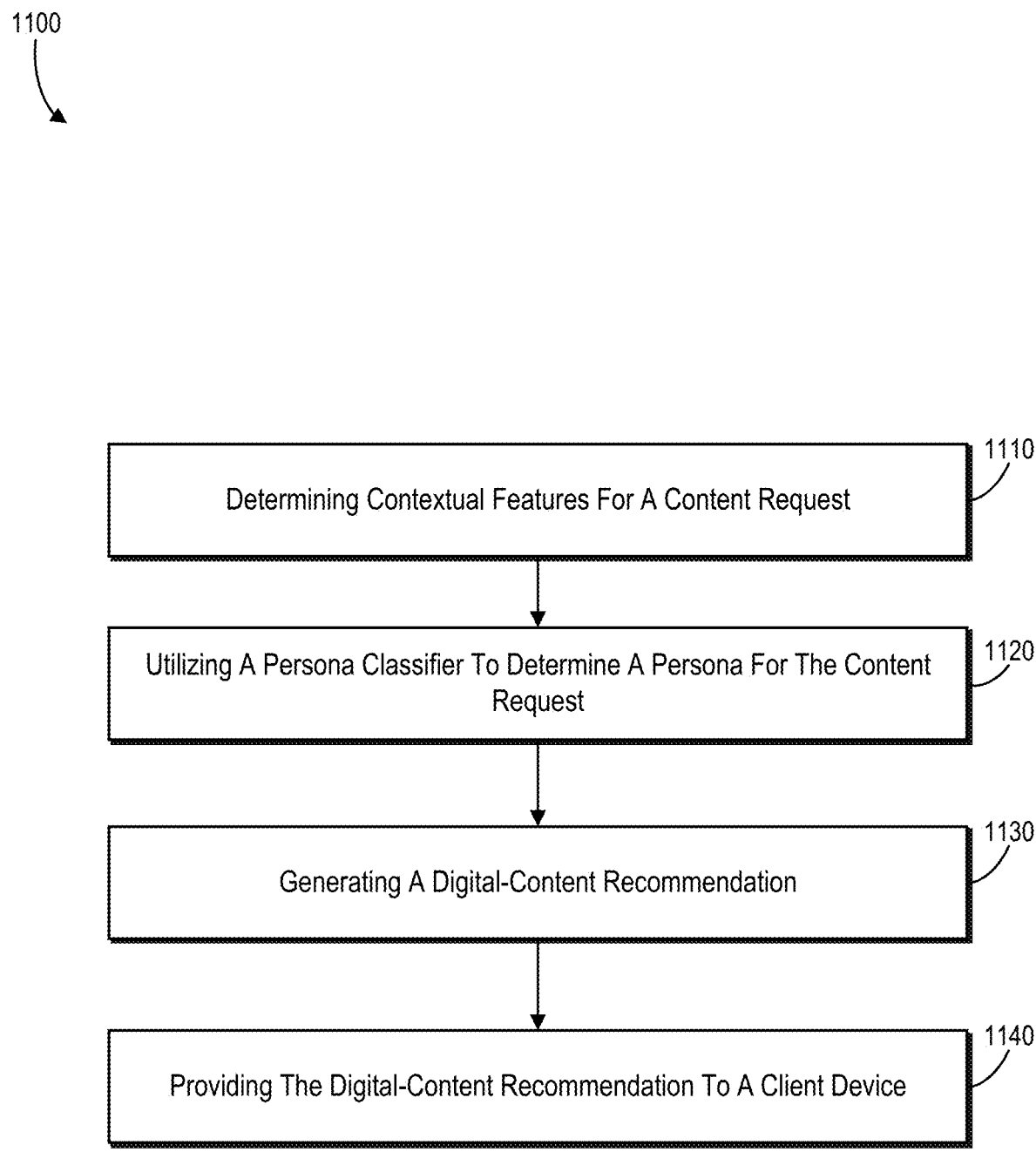
FIG. 11 illustrates a flowchart of a series of acts for applying a persona classifier to determine a persona for a content request in accordance with one or more embodiments.

Turning now to FIG. 11, this figure illustrates a flowchart of a series of acts 1100 of applying a persona classifier to determine a persona for a content request in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable storage medium can comprise instructions that, when executed by one or more processors, cause a computing device to perform the acts depicted in FIG. 11. In still further embodiments, a system can perform the acts of FIG. 11.

As shown in FIG. 11, the acts 1100 include an act 1110 of determining contextual features for a content request. For example, in some embodiments, the act 1110 includes determining contextual features for a content request corresponding to a user account. In one or more embodiments, determining contextual features for a content request comprises determining the contextual features for the content request after the client device transmits the content request and before transmission of digital content to the client device. In certain embodiments, the contextual features comprise a computing device, a location, and a time of day.

As further shown in FIG. 11, the acts 1100 include an act 1120 of utilizing a persona classifier to determine a persona for the content request. For example, in certain embodiments, the act 1120 includes utilizing a persona classifier to determine a persona for the content request from among a plurality of personas corresponding to the user account based on the contextual features. For example, in certain embodiments, utilizing the persona classifier to determine the persona for the content request from among the plurality of personas comprises using a persona-prediction tree to map the contextual features to a persona bin corresponding to the persona.

In some implementations, the plurality of personas corresponding to the user account comprises a first persona corresponding to a first preference for one or more first genres of digital content and a first combination of one or more computing devices, locations, and times; and a second persona corresponding to a second preference for one or more second genres of digital content and a second combination of one or more computing devices, locations, and times. Similarly, in certain embodiments, the plurality of personas corresponding to the user account comprises a first persona corresponding to a first combination of one or more of a computing device, a genre of digital content, a location, or a time of day; and a second persona corresponding to a second combination of one or more of a computing device, a genre of digital content, a location, or a time of day.

As further shown in FIG. 11, the acts 1100 include an act 1130 of generating a digital-content recommendation. For example, in certain implementations, the act 1130 includes utilizing a factorization machine to generate a digital-content recommendation based on the persona. Additionally, in some implementations, utilizing the factorization machine to generate the digital-content recommendation comprises generating a recommendation for digital-audio content or digital-video content. Alternatively, in certain embodiments, the act 1130 includes utilizing a regression model to generate a digital-content recommendation based on the persona. In some cases, the act 1130 includes utilizing a factorization machine or a regression model to generate the digital-content recommendation based on the persona.

As further shown in FIG. 11, the acts 1100 include an act 1140 of providing the digital-content recommendation to a client device. For example, in some embodiments, the act 1140 includes providing the digital-content recommendation to a client device associated with the user account. Additionally, in certain implementations, providing the digital-content recommendation to the client device comprises: providing the digital-content recommendation as a selectable option to transmit digital content to the client device; or providing the digital content for the client device to present within a graphical user interface and without user selection of the digital content.

In addition to the acts 1110-1140, in some embodiments, the acts 1100 further include determining additional contextual features for an additional content request corresponding to the user account; utilizing the persona classifier to determine an additional persona for the additional content request from among the plurality of personas corresponding to the user account based on the additional contextual features; generating an additional digital-content recommendation based on the additional persona; and providing the digital-content recommendation to an additional client device associated with the user account. In some such embodiments, generating the additional digital-content recommendation comprises utilizing a factorization machine or a regression model to generate the additional digital-content recommendation based on the additional persona.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 12:
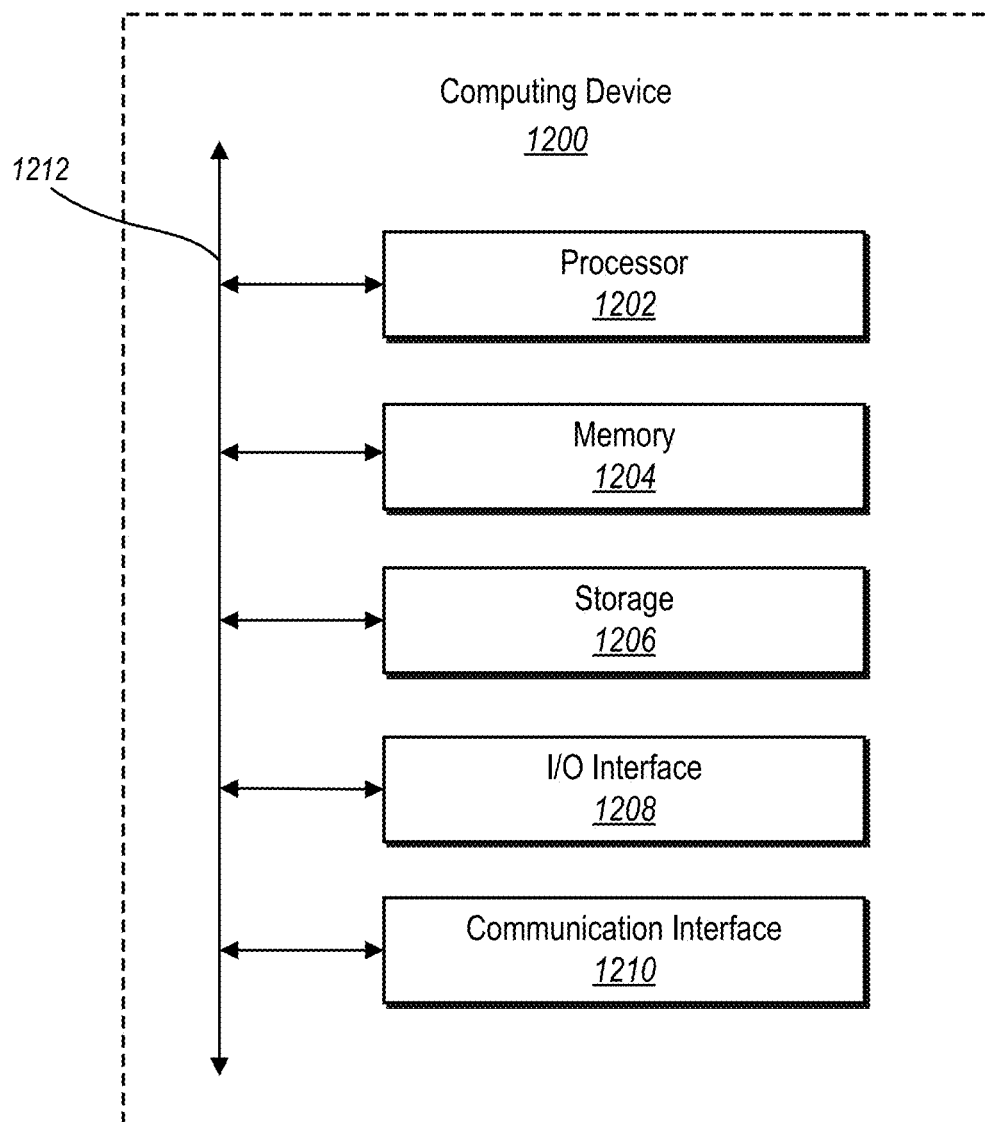
FIG. 12 illustrates a block diagram of an exemplary computing device for implementing one or more embodiments of the present disclosure.

FIG. 12 illustrates a block diagram of exemplary computing device 1200 that may be configured to perform one or more of the processes described above. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for digitizing real-world objects, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions related to object digitizing processes (e.g., digital scans, digital models).

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example and not by way of limitation, the communication interface 1210 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. In a digital medium environment for detecting digital personas corresponding to user accounts, a computer-implemented method of training and applying persona classifiers comprising:
    generating a plurality of initial bins corresponding to a plurality of projection values representing a plurality of content-consumption events of a user account;
    creating a plurality of persona bins from the plurality of initial bins by combining initial bins together or maintaining initial bins apart based on projection-value differences among the plurality of initial bins;
    detecting a content request from a client device of a plurality of client devices corresponding to the user account;
    determining contextual features for the content request by identifying a location identifier for a location of the client device and a computing-device identifier for the client device from among a plurality of computing-device identifiers corresponding to the user account;
    utilizing a persona classifier to determine a persona for the content request from among a plurality of personas associated with the user account based on the contextual features by mapping the contextual features to a persona bin from among the plurality of persona bins; and
    utilizing a factorization machine to generate, for display on the client device, a digital-content recommendation based on the persona.

2. The method of claim 1, wherein the plurality of personas associated with the user account comprise:
    a first persona corresponding to a first combination of one or more of a computing device, a genre of digital content, a location, or a time of day; and
    a second persona corresponding to a second combination of one or more of a computing device, a genre of digital content, a location, or a time of day.

3. The method of claim 1, wherein the plurality of content-consumption events comprises one or more of user ratings of digital content associated with the user account or content-consumption sessions of digital content that progress to a threshold time within the digital content.

4. The method of claim 1, wherein utilizing the factorization machine to generate the digital-content recommendation comprises generating a recommendation for digital-audio content or digital-video content.

5. The method of claim 1, further comprising providing the digital-content recommendation to the client device by:
    providing the digital-content recommendation as a selectable option to transmit digital content to the client device; or
    providing the digital content for the client device to present within a graphical user interface and without user selection of the digital content.

6. A non-transitory computer readable storage medium comprising instructions that, when executed by at least one processor, cause a system to:
    generate a plurality of initial bins corresponding to a plurality of projection values representing a plurality of content-consumption events of a user account;
    create a plurality of persona bins from the plurality of initial bins by combining initial bins together or maintaining initial bins apart based on projection-value differences among the plurality of initial bins;
    receive a content request from a client device of a plurality of client devices corresponding to the user account;

determine contextual features for the content request by identifying a location identifier for a location of the client device and a computing-device identifier for the client device from among a plurality of computing-device identifiers corresponding to the user account;

utilize a persona classifier to determine a persona for the content request from among a plurality of personas corresponding to the user account based on the contextual features by mapping the contextual features to a persona bin from among the plurality of persona bins; and generate, for display on the client device, a digital-content recommendation based on the persona.

7. The non-transitory computer readable storage medium of claim 6, further comprising instructions that, when executed by the at least one processor, cause the system to determine the contextual features for the content request after the client device transmits the content request and before transmission of digital content to the client device.

8. The non-transitory computer readable storage medium of claim 6, wherein the plurality of personas corresponding to the user account comprise:
a first persona corresponding to a first preference for one or more first genres of digital content and a first combination of one or more computing devices, one or more locations, and one or more times; and
a second persona corresponding to a second preference for one or more second genres of digital content and a second combination of one or more computing devices, one or more locations, and one or more times.

9. The non-transitory computer readable storage medium of claim 6, further comprising instructions that, when executed by the at least one processor, cause the system to determine the contextual features for the content request by identifying a time indicator for a time of day.

10. The non-transitory computer readable storage medium of claim 6, further comprising instructions that, when executed by the at least one processor, cause the system to generate the digital-content recommendation based on the persona by utilizing a factorization machine or a regression model to generate the digital-content recommendation based on the persona.

11. A system for applying persona classifiers to predict personas for content requests comprising:
at least one processor;
at least one non-transitory computer memory comprising a persona classifier, a factorization machine, a content-consumption log for a user account, and instructions that, when executed by at least one processor, cause the system to:
analyze the content-consumption log comprising a plurality of content-consumption events for the user account;
generate a plurality of projection values representing the plurality of content-consumption events of the user account;
train the persona classifier to predict personas for content requests by:
generating a plurality of initial bins corresponding to the plurality of projection values;
creating a plurality of persona bins from the plurality of initial bins by combining initial bins together or maintaining initial bins apart based on projection-value differences among the plurality of initial bins; and
generating a persona-prediction tree that maps training contextual features to the plurality of persona bins, wherein the training contextual features correspond to the plurality of content-consumption events and comprise location identifiers for locations of client devices corresponding to the user account and computing-device identifiers for client devices corresponding to the user account.

12. The system of claim 11, wherein each content-consumption event is represented by a feature vector and each feature vector representing a content-consumption event comprises contextual-feature values corresponding to one or more of a computing device, a genre of digital content, a location, or a time of day.

13. The system of claim 11, further comprising instructions that, when executed by the at least one processor, cause the system to:
generate a principal-component-analysis projection based on a plurality of feature vectors representing the plurality of content-consumption events; and
generate the plurality of projection values representing the plurality of content-consumption events based on the principal-component-analysis projection.

14. The system of claim 11, further comprising instructions that, when executed by the at least one processor, cause the system to:
generate the plurality of initial bins corresponding to the plurality of projection values by generating a first initial bin corresponding to a first projection value, a second initial bin corresponding to a second projection value, and a third initial bin corresponding to a third projection value;
compare the first projection value to each of the second projection value and the third projection value; and
combine the initial bins together in part by combining the first initial bin and the second initial bin into a combined bin based on the first projection value and the second projection value having projection values within a threshold variance.

15. The system of claim 14, further comprising instructions that, when executed by the at least one processor, cause the system to maintain the third initial bin apart from the combined bin by:
determining a combined projection value for the combined bin based on an average of the first projection value and the second projection value;
comparing the combined projection value for the combined bin to the third projection value for the third initial bin; and
based on the combined projection value and the third projection value having projection values outside the threshold variance, maintaining the combined bin and the third initial bin as separate bins.

16. The system of claim 11, further comprising instructions that, when executed by the at least one processor, cause the system to create the plurality of persona bins in part by:
comparing each of the plurality of initial bins to each other based on projection values;
identifying initial-bin pairs corresponding to a smallest total of projection-value differences; and
comparing each projection-value difference corresponding to each initial-bin pair of the initial-bin pairs to a threshold variance.

17. The system of claim 11, further comprising instructions that, when executed by the at least one processor, cause the system to create the plurality of persona bins by:
determining that a first combined projection value corresponding to a first combined bin and a second combined projection value corresponding to a second combined bin are within a threshold variance;

combining the first combined bin and the second combined bin a larger combined bin, wherein larger combined bin is part of the plurality of persona bins; and determining that the plurality of persona bins each correspond to projection values having projection-value differences from each other outside the threshold variance.

18. The system of claim 11, further comprising instructions that, when executed by the at least one processor, cause the system to generate the persona-prediction tree that maps the training contextual features to the plurality of persona bins by:

mapping a first training-contextual-feature combination of the training contextual features to a first persona bin of the plurality of persona bins; and mapping a second training-contextual-feature combination and a third training-contextual-feature combination of the training contextual features to a second persona bin of the plurality of persona bins.

19. The system of claim 11, further comprising instructions that, when executed by the at least one processor, cause the system to:

receive a content request from a client device of the client devices corresponding to the user account;

determine contextual features for the content request by identifying a location identifier for a location of the client device and a computing-device identifier for the client device from among the computing-device identifiers corresponding to the user account;

utilize the persona classifier to determine a persona for the content request from among ft the plurality of personas corresponding to the user account based on the contextual features by mapping the contextual features to a persona bin from among the plurality of persona bins; and based on the persona, utilize the factorization machine to generate a digital-content recommendation for presentation on the client device.

20. The system of claim 11, wherein the plurality of personas corresponding to the user account comprise:

a first persona corresponding to a first preference for one or more first genres of digital content and a first combination of one or more computing devices, one or more locations, and one or more times; and a second persona corresponding to a second preference for one or more second genres of digital content and a second combination of one or more computing devices, one or more locations, and one or more times.

* * * * *